United States Patent
Kodama et al.

(10) Patent No.: US 7,529,308 B2
(45) Date of Patent: May 5, 2009

(54) COMMUNICATION APPARATUS AND COMMUNICATION METHOD USING DIGITAL WAVELET MULTI CARRIER TRANSMISSION SYSTEM

(75) Inventors: Nobutaka Kodama, Fukuoka (JP); Hisao Koga, Chikushi-gun (JP)

(73) Assignee: Panasonic Corporation, Osaka (JP)

( * ) Notice: Subject to any disclaimer, the term of this patent is extended or adjusted under 35 U.S.C. 154(b) by 601 days.

(21) Appl. No.: 11/104,650

(22) Filed: Apr. 13, 2005

(65) Prior Publication Data

US 2005/0238089 A1    Oct. 27, 2005

(30) Foreign Application Priority Data

Apr. 16, 2004    (JP)    ............ P. 2004-121373

(51) Int. Cl.
*H04L 27/28* (2006.01)

(52) U.S. Cl. ............ 375/260; 375/146; 375/366; 370/208; 370/500

(58) Field of Classification Search .............. 375/145, 375/146, 220, 222, 257, 260, 295, 365, 366; 370/203, 208, 319, 500, 514
See application file for complete search history.

(56) References Cited

U.S. PATENT DOCUMENTS

| | | | |
|---|---|---|---|
| 5,497,398 A | 3/1996 | Tzannes et al. | |
| 5,631,610 A | 5/1997 | Sandberg et al. | |
| 5,636,246 A | 6/1997 | Tzannes et al. | |
| 5,995,539 A | 11/1999 | Miller | |
| 6,369,758 B1 | 4/2002 | Zhang | |
| 6,434,119 B1 | 8/2002 | Wiese et al. | |
| 6,466,629 B1* | 10/2002 | Isaksson et al. ............ | 375/316 |
| 6,473,409 B1 | 10/2002 | Malvar | |
| 6,487,574 B1 | 11/2002 | Malvar | |
| 6,496,795 B1 | 12/2002 | Malvar | |
| 6,498,808 B1* | 12/2002 | Tzannes ............ | 375/225 |
| 6,532,256 B2 | 3/2003 | Miller | |
| 6,657,949 B1 | 12/2003 | Jones, IV et al. | |
| 6,952,441 B2* | 10/2005 | Peeters ............ | 375/222 |
| 7,206,359 B2* | 4/2007 | Kjeldsen et al. ............ | 375/316 |
| 7,251,291 B1* | 7/2007 | Dubuc et al. ............ | 375/296 |
| 2001/0033612 A1 | 10/2001 | Peeters | |

(Continued)

FOREIGN PATENT DOCUMENTS

EP    1039715    9/2000

(Continued)

OTHER PUBLICATIONS

Japanese Office Action dated Nov. 22, 2006 with English translation.

(Continued)

*Primary Examiner*—Dac V Ha
(74) *Attorney, Agent, or Firm*—Dickinson Wright, PLLC

(57) ABSTRACT

In case of disposing a pilot symbol in data transmission which depends on a DWMC transmission system, in a plurality of transmission symbols on a time axis, a pilot symbol, which becomes a signal of a sine wave, is configured, by giving contiguous identical data in a plurality of predetermined symbols. By transmitting a transmission signal with the use of this pilot signal, between a transmitting device and a receiving device, it is possible to carry out channel equalization by complex information which is obtained from a pilot symbol.

14 Claims, 22 Drawing Sheets

U.S. PATENT DOCUMENTS

| | | |
|---|---|---|
| 2003/0012308 A1 | 1/2003 | Sampath |
| 2003/0156014 A1 | 8/2003 | Kodama et al. |
| 2006/0274638 A1 | 12/2006 | Walton |

FOREIGN PATENT DOCUMENTS

| | | |
|---|---|---|
| JP | 11252031 | 9/1999 |
| JP | 11275165 | 10/1999 |
| JP | 2000 278237 | 10/2000 |
| JP | 2001 298439 | 10/2001 |
| JP | 2003 218831 | 7/2003 |

OTHER PUBLICATIONS

M. C. Sun, et al., "Power-Line Communication using DWMT Modulation," 2002 IEEE International Symposium on Circuits and Systems, vol. 4, XP002271367, pp. 493-496, May 26-29, 2002.

"Part 11: Wireless LAN Medium Access Control (MAC) and Physical Layer (PHY) Specifications: High-Speed Physical Layer in the 5 GHZ Band," IEEE Std 802.11a-1999, Supplement to IEEE Standard for Information Technology, Telecommunications and Information Exchange between Systems, Local and Metropolitan Area Networks, Specific Requirements, The Institute of Electrical and Electronics Engineers, Inc., ISBN 0-7381-1809-5, pp. 21-25, Dec. 30, 1999.

Henrique S. Malvar, "Signal Processing with Lapped Transforms," ISBN 089006-467-9, Artech House, Inc, Norwood, MA, pp. 204-217, 1992.

J. Alhava, et al., "Adaptive Sine-Modulated/Cosine-Modulated Filter Bank Equalizer for Transmultiplexers," European Conference on Circuit Theory and Design, Espoo, Finland, Aug. 28-31, 2001, pp. 337-340.

A. Viholainen, et al., "Implementation of Parallel Cosine and Sine Modulated Filter Banks for Equalized Transmultiplexer Systems," Telecommunications Laboratory, Tampere University of Technology, Tampere, Finland, IEEE, 2001, pp. 3625-2628.

A. Viholainen, et al., "Complex Modulated Critically Sampled Filter Banks Based on Cosine and Sine Modulation," Institute of Communications Engineering, Tampere University of Technology, Tampere, Finland, IEEE, 2002, pp. 833-836.

J. Alhava, et al., "Exponentially-Modulated Filter Bank-Based Transmultiplexer," Tampere University of Technology, Institute of Communications Engineering, Tampere, Finland, IEEE, 2003, pp. 233-236.

J. Alhava, et al., "Efficient Implementation of Complex Exponentially-Modulated Filter Banks," Tampere University of Technology, Institute of Communications Engineering, Tampere, Finland, 2003, pp. 157-160.

Y. Yang, et al., "DSP Implementation of Low-Complexity Equalizer for Multicarrier Systems," Institute of Communications Engineering, Tampere University of Technology, IEEE, 2003, pp. 271-274.

A. Viholainen, et al., "Alternative Subband Signal Structures for Complex Modulated Filter Banks with Perfect Reconstruction," Institute of Communications Engineering, Tampere University of Technology, Tampere, Finland, IEEE, 2004, pp. 525-528.

T. Ihalainen, et al., "Efficient Per-Carrier Channel Equalizer for Filter Bank Based Multicarrier Systems," Institute of Communications Engineering, Tampere University of Technology, Tampere, Finland, IEEE, 2005, pp. 3175-3178.

K.-W. Cheong, et al., "Discrete Wavelet Transforms in Multi-Carrier Modulation," XP000801553, IEEE, Globecom 1998, The Bridge to Global Integration, IEEE Global Telecommunications Conference, New York, NY, vol. 5, pp. 2794-2799, Nov. 1998.

* cited by examiner

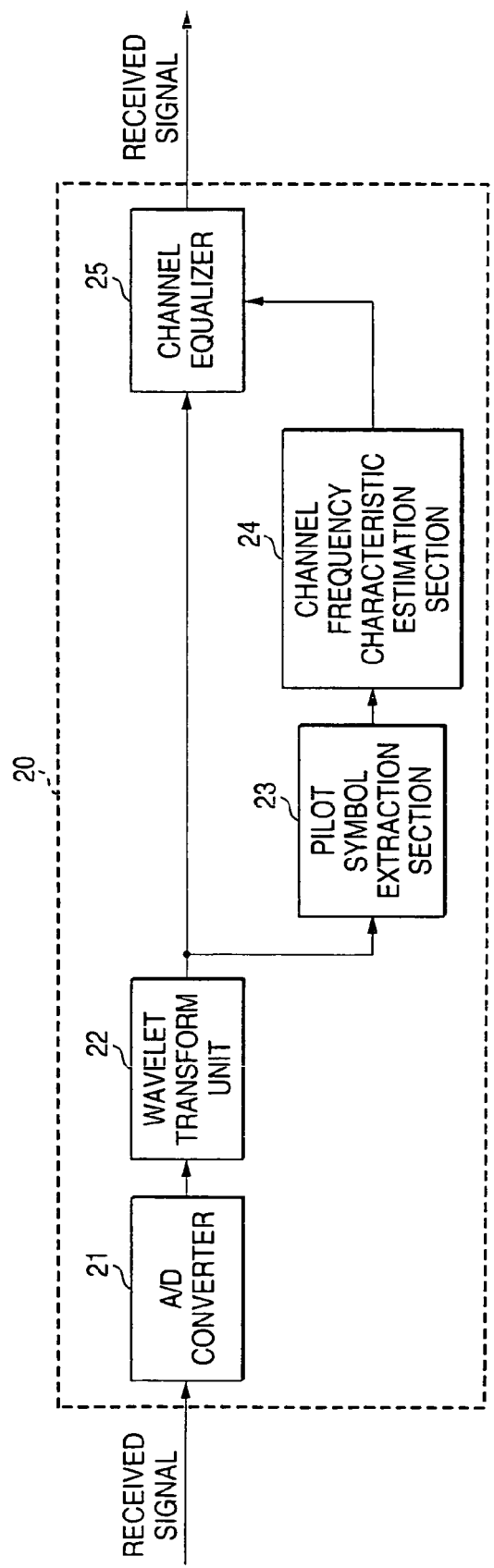

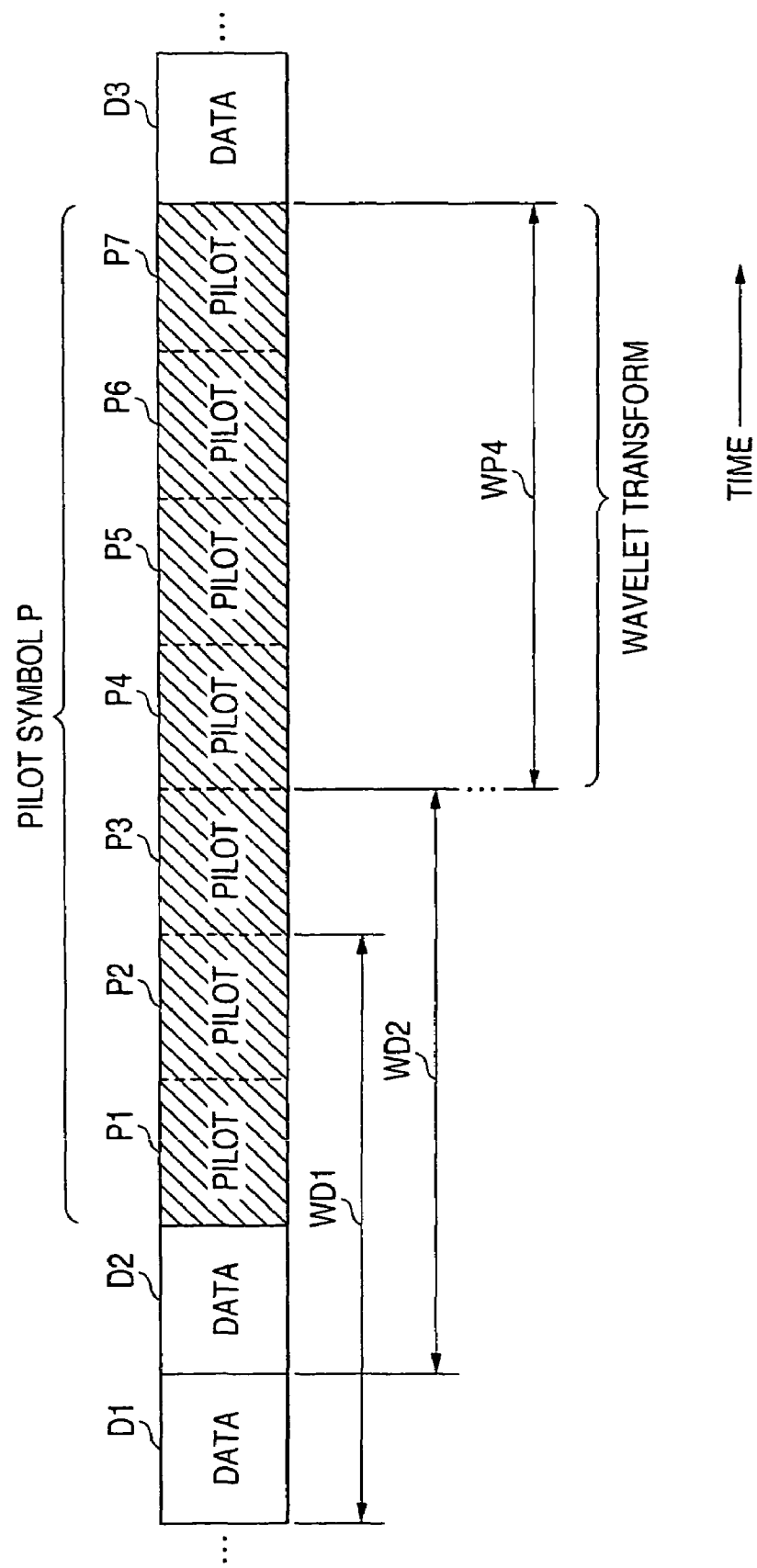

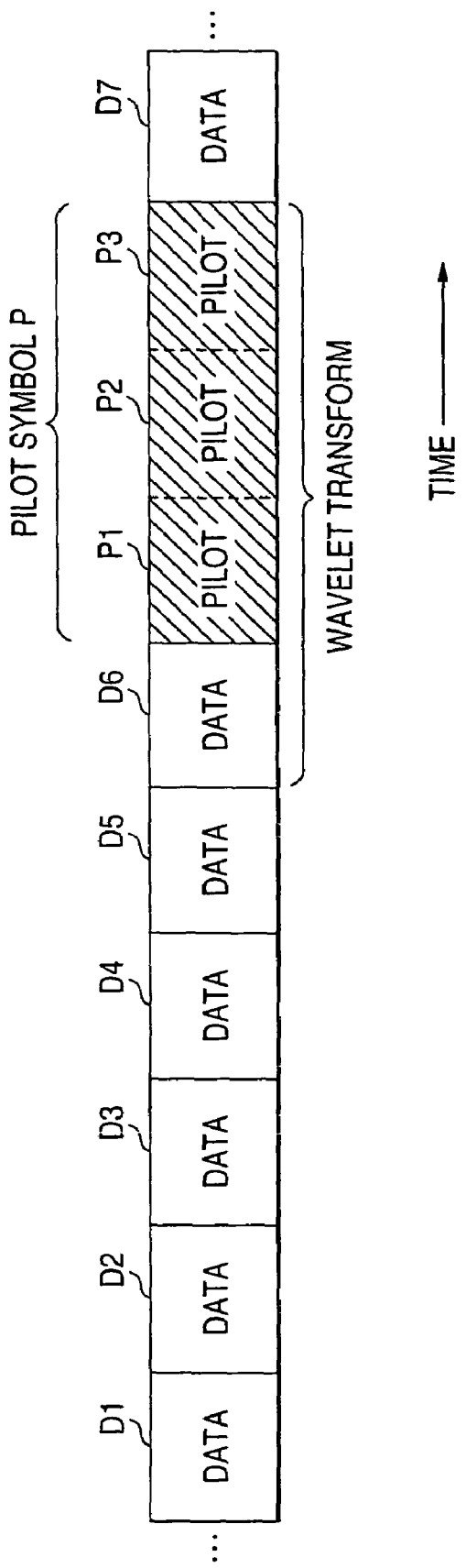

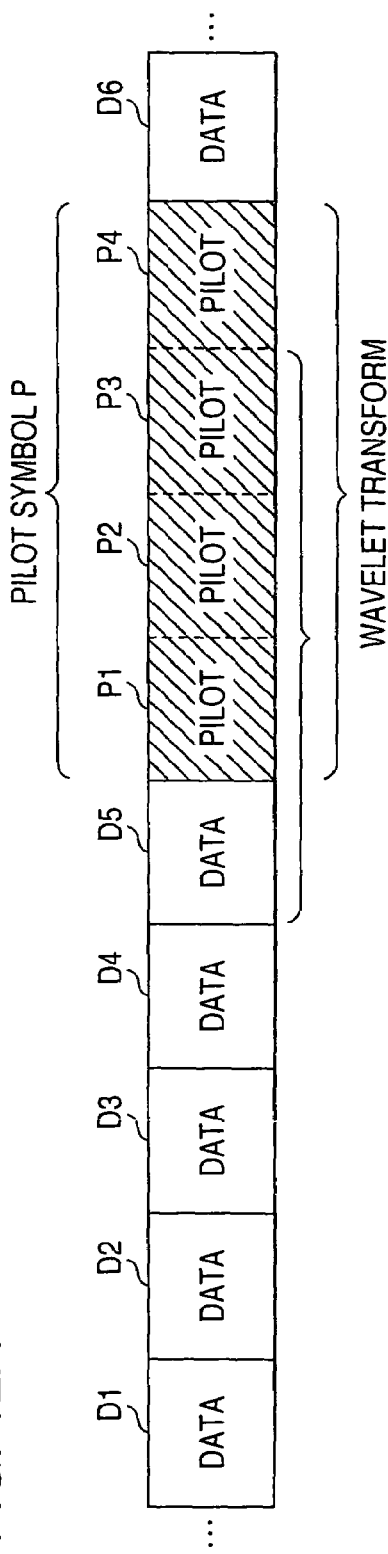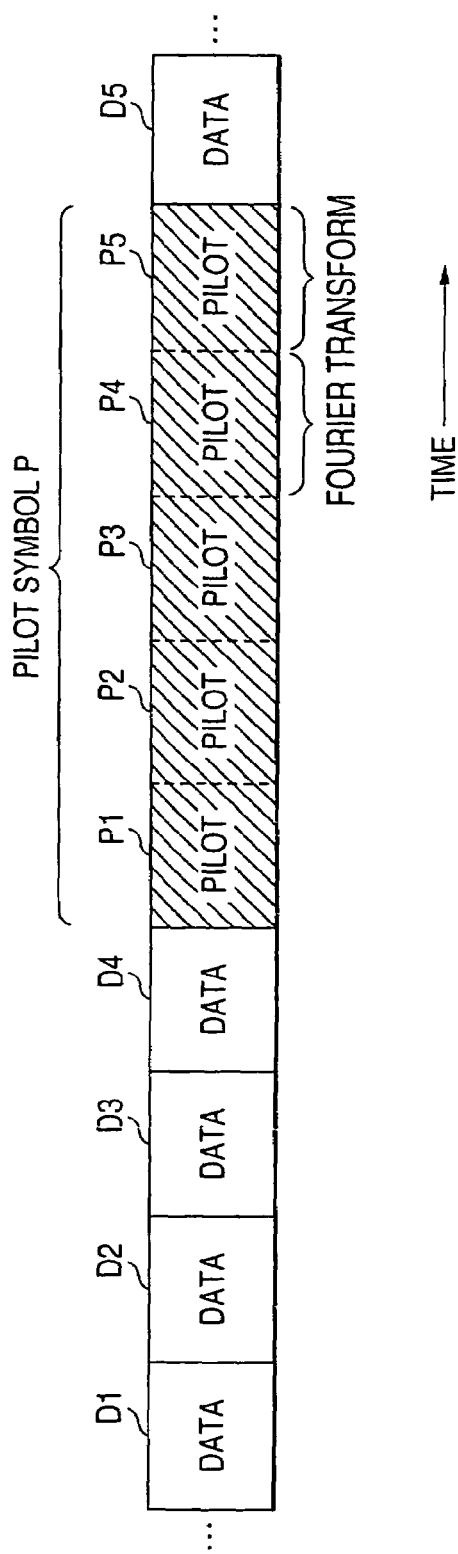

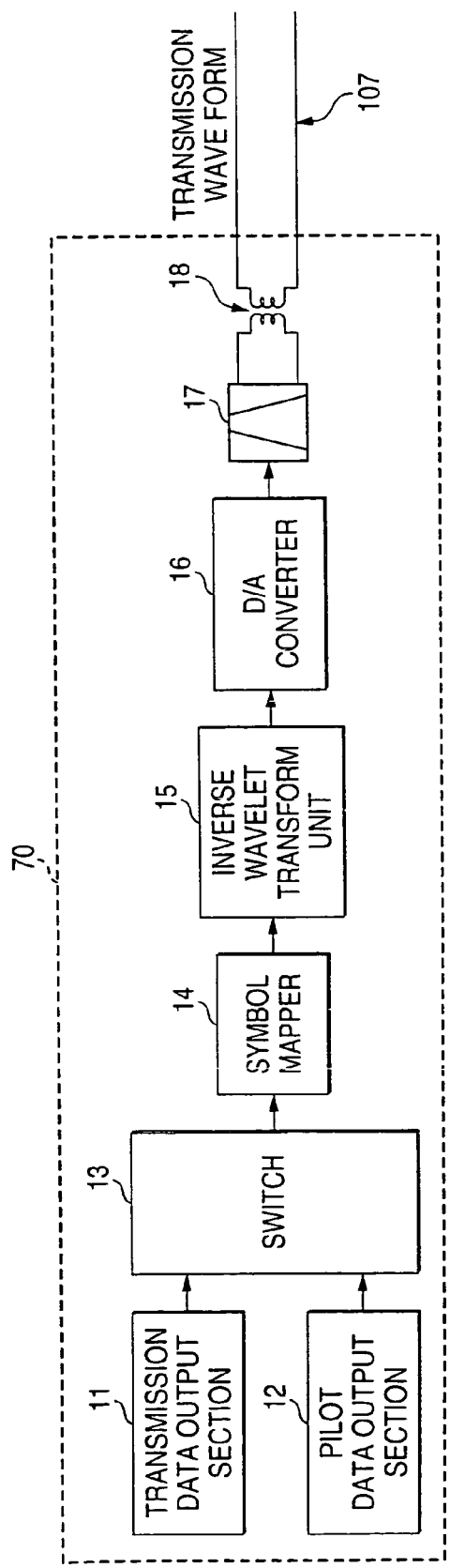

COMMUNICATION APPARATUS AND COMMUNICATION METHOD USING DIGITAL WAVELET MULTI CARRIER TRANSMISSION SYSTEM

BACKGROUND OF THE INVENTION

The present invention relates to a communication apparatus and a communication method of a multi carrier transmission system, and in particular, to a communication apparatus and a communication method using a multi carrier transmission method (Digital Wavelet Multi Carrier-transmission system, hereinafter, described as "DWMC transmission system") which carries out data transmission by digital modulating and demodulating processing with the use of a real coefficient wavelet filter bank.

In a terrestrial digital broadcasting system etc., wide band data transmission is enabled by a multi carrier transmission system with the use of OFDM (Orthogonal Frequency Division Multiplexing). As a data transmission system depending on this type of the multi carrier transmission system with the use of OFDM, a multi carrier transmission method depending on digital modem processing with the use of a real coefficient wavelet filter bank (DWMC transmission method) has been proposed. In the DWMC transmission method, a plurality of digital modulated waves are combined by use of the real coefficient filter bank, and thereby, transmission signals are generated. As a modulation system of each carrier, PAM (Pulse Amplitude Modulation) etc. are used.

Data transmission, which depends on the DWMC transmission method, will be described by use of FIGS. 15 to 18. FIG. 15 is a view which shows an example of an wavelet wave form, and FIG. 16 is a view which shows an example of a transmission wave form in the DWMC transmission method, and FIG. 17 is a view which shows an example of a transmission spectrum in the DWMC transmission method, and FIG. 18 is a view which shows a configuration example of a transmission frame in the DWMC transmission method.

In the data transmission which depends on the DWMC transmission method, as shown in FIG. 15, impulse responses of each sub carrier are transmitted over being overlapped in each sub carrier. Each transmission symbol becomes such a time wave form that impulse responses of each sub carrier were combined, as shown in FIG. 16. An example of an amplitude spectrum is shown in FIG. 17. In the DWMC transmission method, approximately several dozen through several hundred of transmission symbols in FIG. 16 are collected to configure one transmission frame. A configuration frame of the DWMC transmission frame is shown in FIG. 18. In this DWMC transmission frame, a symbol for frame synchronization, a symbol for equalization etc. are included in addition to a symbol for information data transmission.

FIG. 19 is a block diagram which shows a conceptual configuration of a communication apparatus as a past example, which is configured by having a transmitting device and a receiving device in case that the DWMC transmission system was adopted.

In FIG. 19, a receiving device 199 is configured by having an A/D converter 110 which carries out analog-digital conversion, a wavelet transform unit 120 which carries out discrete wavelet transformation, a parallel/serial (P/S) converter 130 which converts parallel data into serial data, and a decision unit 140 which carries out judgment of received signals. A transmitting device 299 is configured by having a symbol mapper 210 which converts bit data into symbol data to carry out symbol mapping, a serial/parallel (S/P) converter 220 which converts serial data into parallel data, an inverse wavelet transform unit 230 which carries out inverse discrete wavelet transformation, and a D/A converter 240 which carries out digital-analog conversion.

An operation of the communication apparatus with the above-described configuration will be described. Firstly, in the transmitting device 299, bit data of transmission data is converted into symbol data by the symbol mapper 210, and symbol mapping (PAM) is carried out in accordance with each symbol data. Then, serial data is converted into parallel data by the S/P converter 220, and thereby, a real number value di (i=1~M, M is a plural number) is given to symbol data with respect to each sub carrier. After that, this real number value is inverse discrete wavelet transformed on a time axis by the inverse wavelet transform unit 230. By this means, sample values of time axis wave forms are generated, and a sample value series, which represents transmission symbols, is generated. Then, this sample value series is converted into analog base band signal wave forms which are continuing in terms of time by the D/A converter 240, and then, transmitted. Here, the number of sample values on a times axis, which are generated by the inverse discrete wavelet transformation, is normally 2 to the n-th power pieces (n is a positive integer).

In the receiving device 199, analog base band signal wave forms, which are obtained from received signals, are sampled with the same sample rate as that of a transmitting side by the A/D converter 110, to obtain a sample value series. Then, this sample value series is discrete wavelet transformed on a frequency axis by the wavelet transform unit 120, and parallel data is converted into serial data by the P/S converter 130. Finally, an amplitude value of each sub carrier is calculated in the decision unit 140, and judgment of a received signal is carried out to obtain reception data.

In addition, as an example of the communication apparatus with the use of the DWMC transmission method, proposed is a power line carrier communication apparatus which carries out data transmission by utilizing a power line which were disposed in a house etc., as communication medium (e.g., see, JP-A-2003-218831).

In the meantime, in the multi carrier transmission system, there is a case to dispose a pilot symbol for transmitting a pilot signal by use of a sine wave signal in a predetermined symbol, in order to carry out adjustment etc. of a phase of transmission data. By information of this pilot symbol, it becomes possible to adjust an amplitude and a phase of transmission data, and to improve an equalization characteristic of a channel characteristic (compensation of a transmission characteristic, etc.) between a transmitting device and a receiving device.

A past multi carrier transmission system with the use of FFT (Fast Fourier Transform) based OFDM is one which carries out FFT as complex number conversion, and therefore, it is possible to generate a pilot symbol having complex information which represents an amplitude and a phase, only by transmitting a known signal (e.g., a signal in which identical data such as all 1 continues) by use of one symbol, in case of disposing a pilot symbol (e.g., see, JP-A-2000-278237).

In contrast to this, a multi carrier transmission system, which depends on wavelet transformation based OFDM to be used in the DWMC transmission method, is one which carried out wavelet transformation as real number conversion, and in addition, even if a pilot symbol, which was simply configured by one symbol, is demodulated, it is not possible to obtain complex information since a filter length is longer than a symbol length, and therefore, in the multi carrier transmission system which depends on wavelet transformation based OFDM, a pilot symbol was not used.

SUMMARY OF THE INVENTION

The invention is one which was made in view of the above-described past circumstances, and aims to provide a multi carrier transmission system communication apparatus and communication method, in which it is possible to use a pilot symbol which can handle complex information, in data transmission of a multi carrier transmission system which depends on wavelet transformation based OFDM for carrying out real coefficient wavelet transformation.

According to the present invention, a communication apparatus of a multi carrier transmission system, which carries out data transmission by digital modem processing, comprises: a modulator which inserts at least one symbol to which contiguous identical data was given into a transmission signal as a pilot symbol, and carries out digital multi carrier modulation processing of transmission signals by use of a filter bank subjecting wavelet transformation; and a transmitter for transmitting transmission signals including said pilot symbol, which has been subjected the digital multi carrier modulation processing by said modulator.

A communication apparatus of a multi carrier transmission system, which carries out data transmission by digital modem processing, comprising: a receiver for receiving transmission signals including a pilot symbol configured by at least one symbol to which contiguous identical data was given; and a demodulator which carries out digital multi carrier demodulation processing of transmission signals received by said receiver with use of a filter bank subjecting wavelet transformation.

Thus, it is possible to provide a communication apparatus and a communication method of a multi carrier transmission system, which is capable of using a pilot symbol which can handle complex information, in data transmission of a multi carrier transmission system which depends on wavelet transformation based OFDM for carrying out real coefficient wavelet transformation.

BRIEF DESCRIPTION OF THE DRAWINGS

FIGS. 1A and 1B are block diagrams which show a major configuration of a communication apparatus which relates to a first embodiment of the invention;

FIG. 3 is a view which schematically shows a part of a transmission frame on a time axis in the first embodiment;

FIG. 8 is a view which schematically shows a part of a transmission frame on a time axis in a fourth embodiment of the invention;

FIGS. 12A and 12B are views which schematically shows a part of a transmission frame on a time axis in a seventh embodiment of the invention;

FIGS. 22A and 22B are block diagrams which show a modified example of a configuration of a communication apparatus which uses a power line as a channel.

DETAILED DESCRIPTION OF THE PREFERRED EMBODIMENTS

In this embodiment, a configuration and an operation of a communication apparatus, which carries out data transmission by use of a multi carrier transmission method (DWMC transmission method) which depends on digital modem processing with the use of a real coefficient wavelet filter bank.

First Embodiment

Figure 20:
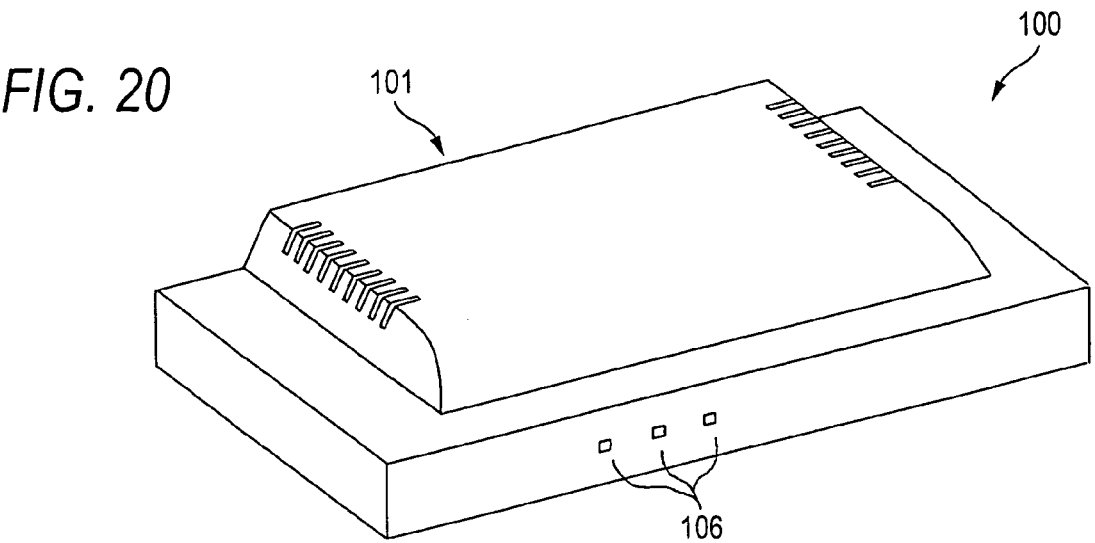
FIG. 20 is an external appearance perspective view which shows a communication apparatus (front surface)
Figure 21:
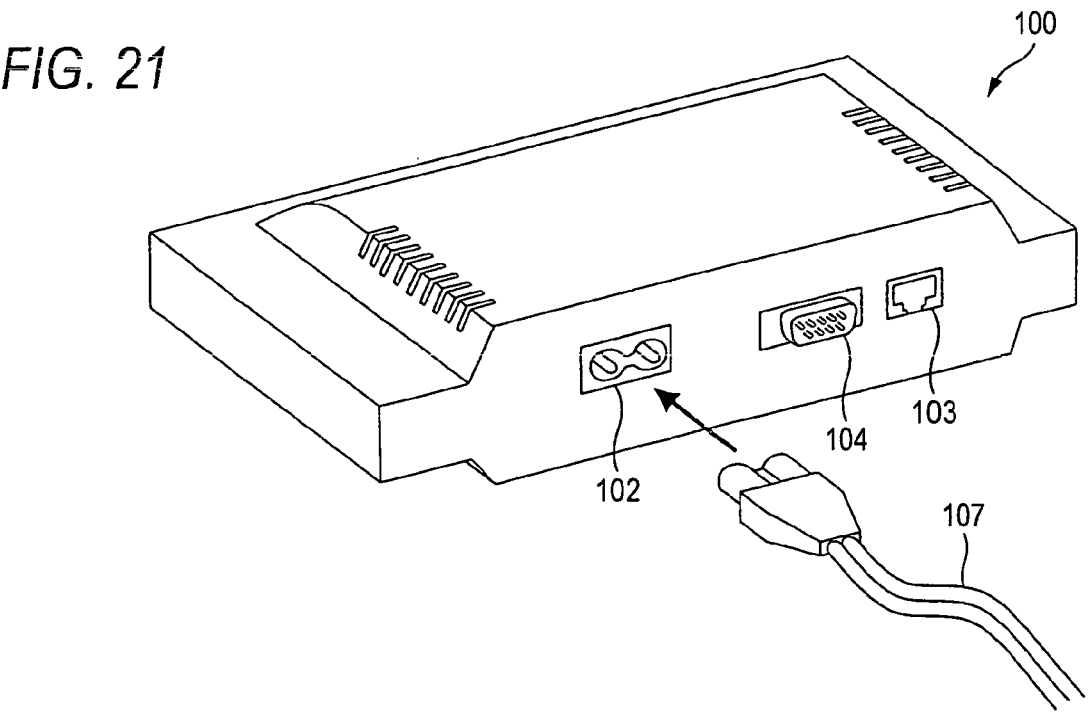
FIG. 21 is an external appearance perspective view which shows the communication apparatus (rear surface)

FIG. 20 is an external appearance perspective view which shows a communication apparatus (front surface), and FIG. 21 is an external appearance perspective view which shows the communication apparatus (rear surface). A communication apparatus 100 in this embodiment is a modem as shown in FIGS. 20 and 21. This communication apparatus 100 is one which configures a transmitting device 70 or a receiving device 80 which will be described later.

The communication apparatus 100 has a housing 101. On a front surface of the housing 101, a display section 106 such as LED (Light Emitting Device) is disposed as shown in FIG. 20. On a rear surface of the housing 101, a power connector 102, a LAN (Local Area Network) modular jack 103 such as RJ45, and a Dsub connector 104 are disposed as shown in FIG. 21. To the power connector 102, a power line 107 such as a parallel cable is connected as shown in FIG. 21. To the modular jack 103, a LAN cable, which is not shown in the figure, is connected. To the Dsub connector 104, a Dsub cable, which is not shown in the figure, is connected.

To the power line 107, a commercial power source such as alternating voltage is applied, and when a pilot symbol, which will be described later, is outputted, the pilot symbol is overlapped with the alternating voltage through a coupler transformer which is not shown in the figure. Meanwhile, as one example of the communication apparatus, the modem in FIGS. 20 and 21 was shown, but there is no particular need to limit to this, and the communication apparatus may be an electric equipment which was equipped with a modem (e.g., a household electrical appliance such as a television receiver).

Figure 1A:
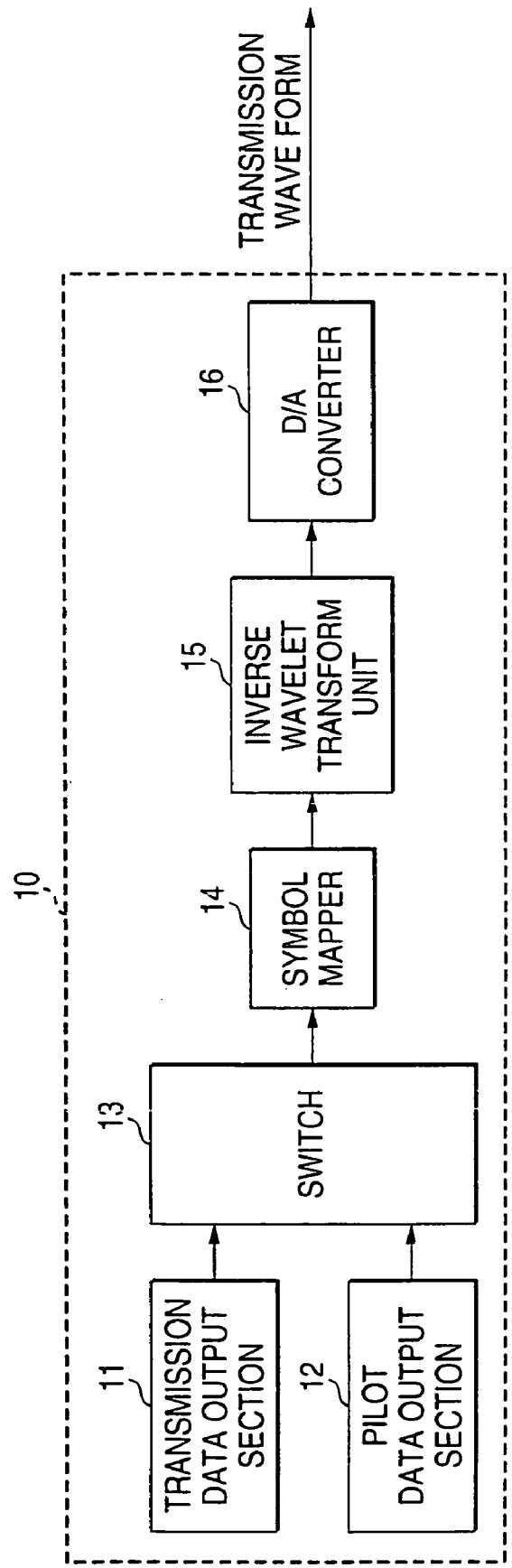

FIGS. 1A and 1B are block diagrams which show a major configuration of a communication apparatus which relates to a first embodiment of the invention. FIG. 1A is a block diagram showing a transmitting device which configures the communication apparatus, and FIG. 1B is a block diagram showing a receiving device which configures the communication apparatus.

A transmitting device 10 is configured by having a transmission data output section 11 which outputs transmission data, a pilot data output section 12 which outputs pilot data for a pilot signal, a switch 13 which carries out a switching selection of transmission data or pilot data, a symbol mapper 14 which converts bit data into symbol data to carry out symbol mapping, an inverse wavelet transform unit 15 which carries out inverse discrete wavelet transformation, and a D/A converter 16 which carries out digital-analog conversion. In the transmitting device 10, the D/A converter 16 has a function of transmitter.

Meanwhile, the transmission data output section 11, the pilot data output section 12, the switch 13, the symbol mapper 14, and the inverse wavelet transformer 15 are configured by a MAC/PHY-IC chip (not shown in the figure) which carries out management of a MAC (Media Access Control) level and a PHY (Physical) layer. The D/A converter 16 is configured by an AFE (Analog Front End) IC chip (not shown in the figure).

A receiving device 20 is configured by having an A/D converter 21 which carries out analog-digital conversion, a wavelet transform unit 22 which carries out discrete wavelet transformation, a pilot symbol extraction section 23 which extracts a pilot symbol from received signals, a channel frequency characteristic estimation section 24, and a channel equalizer 25 which carries out equalization of a transmission characteristic (compensation of a transmission characteristic, etc.) between the transmitting device 10 and the receiving device 20. In the receiving device 20, the A/D converter 21 has a function of receiver.

Meanwhile, the wavelet transformer 22, the pilot symbol extraction section 23, the channel frequency characteristic estimator 24, and the channel equalizer 25 are configured by a MAC/PHY-IC chip (not shown in the figure) which carries out management of a MAC (Media Access Control) level and a PHY (Physical) layer. The A/D converter 21 is configured by an AFE (Analog Front End) IC chip (not shown in the figure).

In the transmitting device 10, in case of outputting transmission data, the transmission data output section 11 is connected to the symbol matter 14 by switching selection of the switch 13. At this time, bit data of arbitrary transmission data, which is outputted from the transmission data output section 11, is converted into symbol data by the symbol mapper 14, and symbol mapping (PAM) is carried out in accordance with each symbol data. After that, by the inverse wavelet transform unit 15, serial data is converted into parallel data and a real number value di ($i=1\sim M$, M is a plural number) is given to the symbol data with respect to each sub carrier, and thereafter, data of this real number value is inverse discrete wavelet transformed on a time axis. A filter bank subjecting a wavelet transformation using a rear coefficient will be referred as a real coefficient wavelet filter bank, hereinafter. By this means, sample values with time axis wave forms are generated, and a sample value series, which represents transmission symbols, is generated. Then, by the D/A converter 16, this sample value series is converted into analog base band signal wave forms which are continuing in terms of time, and then, transmitted.

In addition, in case of outputting a pilot symbol, the pilot data output section 12 is connected to the symbol mapper 14 by switching selection of the switch 13. At this time, bit data of pilot data, which is outputted from the pilot data output section 12, is converted into serial data by the symbol mapper 14. Then, by the inverse wavelet transform unit 15, serial data is converted into parallel data, and thereby, contiguous identical data (e.g., all 1, all 0, etc.) is given to a relevant symbol, and this data is inverse discrete wavelet transformed on a time axis. After that, by the D/A converter 16, it is converted into an analog base band signal wave form which includes a pilot symbol, and then, transmitted. The contiguous identical data is a data series which corresponds to each symbol and is configured by consecutive identical values (e.g., 0 or 1), and for example, contiguous identical data, which corresponds to 1 symbol, is configured by all 1 (1, 1, 1, . . . , 1), and contiguous identical data, which corresponds to 2 symbol, is configured by all 0 (0, 0, 0, . . . 0), and contiguous identical data, which corresponds to K symbol, is configured by all 1 (1, 1, 1, . . . , 1).

In the above-described transmitting device 10, the inverse wavelet transform unit 15 is one which has a function of demodulator, and the pilot data output section 12 and the switch 13 are ones having a function of pilot symbol generator.

In the receiving device 20, analog base band signal wave forms, which are obtained from received signals by the A/D converter 21, are sampled with the same sampling rate as that of a transmitting side, and a sample value series is obtained. Then, by the wavelet transform unit 22, this sample value series is discrete wavelet transformed on a frequency axis, and parallel data is converted into serial data. The, by the pilot symbol extraction section 23, a pilot symbol is extracted from received signals, and by the channel frequency characteristic estimation section 24, a frequency characteristic of a channel is estimated. Then, an equalization amount for carrying out compensation etc. of a transmission characteristic of a channel by the channel equalizer 25, through the use of this channel estimation information, with respect to each sub carrier, is obtained and equalization of received signals is carried out.

In the above-described receiving device 20, the wavelet transform unit 22 is one which has a function of demodulator, and the pilot symbol extraction section 23 is one which has a function of pilot symbol extractor, and the channel frequency characteristic estimation section is one which has a function of channel characteristic estimation means.

Figure 2B:
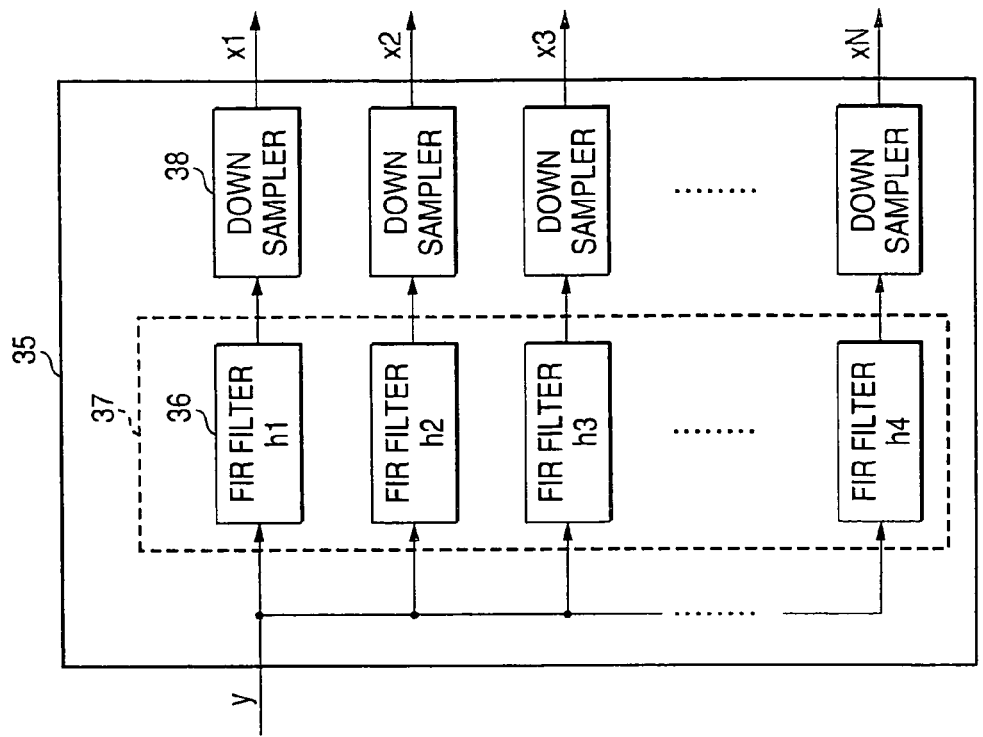
FIGS. 2A and 2B are views which show one example of a schematic configuration of an inverse wavelet transform unit and a filter bank circuit which a wavelet transform unit has in the first embodiment.
Figure 2A:
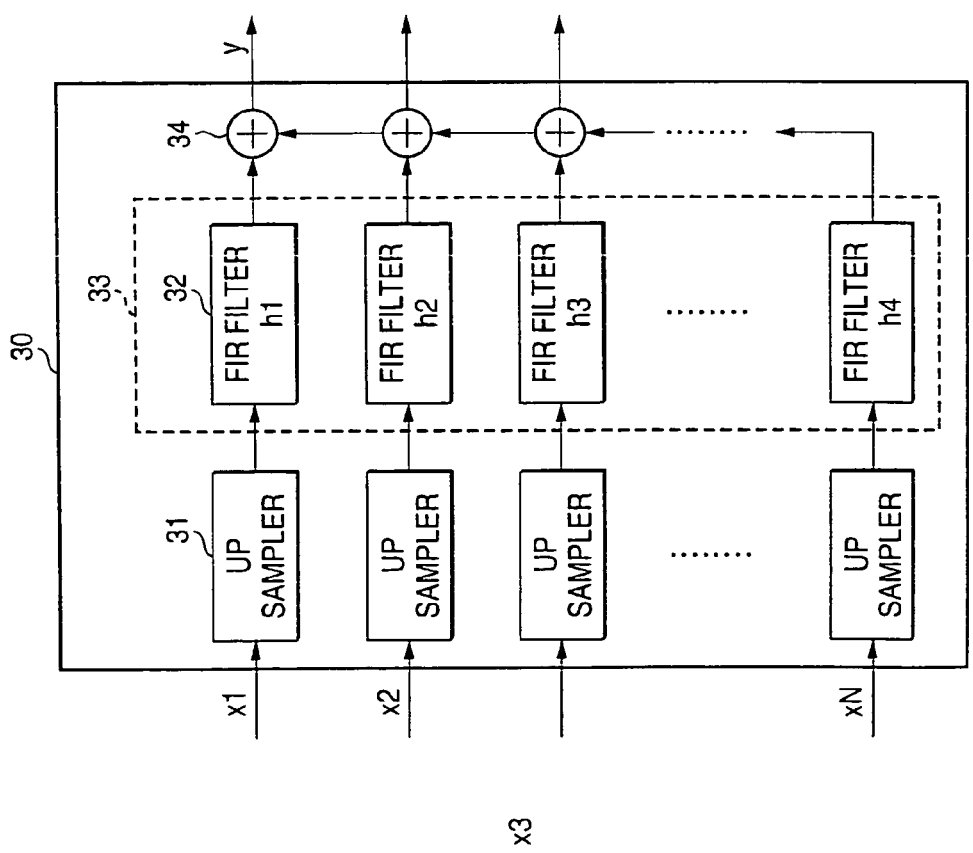

FIGS. 2A and 2B are views which show one example of a schematic configuration of a filter bank circuit which the inverse wavelet transform unit and the wavelet transform unit of the first embodiment have. Particularly, FIG. 2A shows a band combining filter bank circuit, and FIG. 2B shows a band division filter bank circuit, respectively. Meanwhile, in this embodiment, as one example of a filter bank circuit, a configuration of a filter bank circuit, which was configured by a commonly used FIR filter, will be described.

As shown in FIG. 2A, the synthesis filter bank circuit 30 is configured by having an up sampler 31 which realizes N times multiple of a sampling rate of signals, a FIR filter group 33 in which a plurality of FIR (Finite Impulse Response) filters 32, which are orthogonal with each other, were combined, and a two input adder 34. The inverse wavelet transform unit 15 is configured by having this synthesis filter bank circuit 30.

In addition, as shown in FIG. 2B, the analysis filter bank circuit 35 has a FIR filter group 37 in which a plurality of FIR filters 36, which are orthogonal with each other, were combined, and a down sampler 38 which realizes 1/N times of a sampling rate. A wavelet transform unit 22 is configured by having this analysis filter bank circuit 35.

Here, assuming that the number of taps in the FIR filter 32 is N, each FIR filter 32 is equipped with (N−1) pieces of delay elements for delaying input data, N pieces of multipliers for multiplying a coefficient to output data and the above-described input data of this delay element, (N−1) pieces of adders for obtaining an accumulated value by adding output data of this multiplier from an input side sequentially. Meanwhile, assuming that the number of sub carriers to be divided is M (M is 2 to the power), the tap number N of the FIR filter 32 is represented by a real number multiple (K times) of M.

Figure 18:
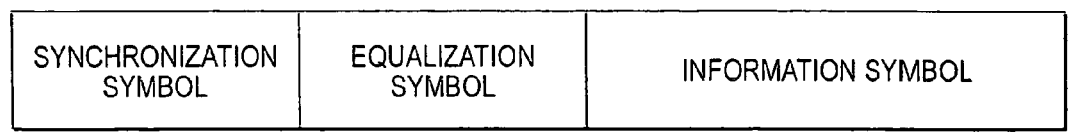
FIG. 18 is a view which shows a configuration example of a transmission frame in the DWMC transmission method.
Figure 19:
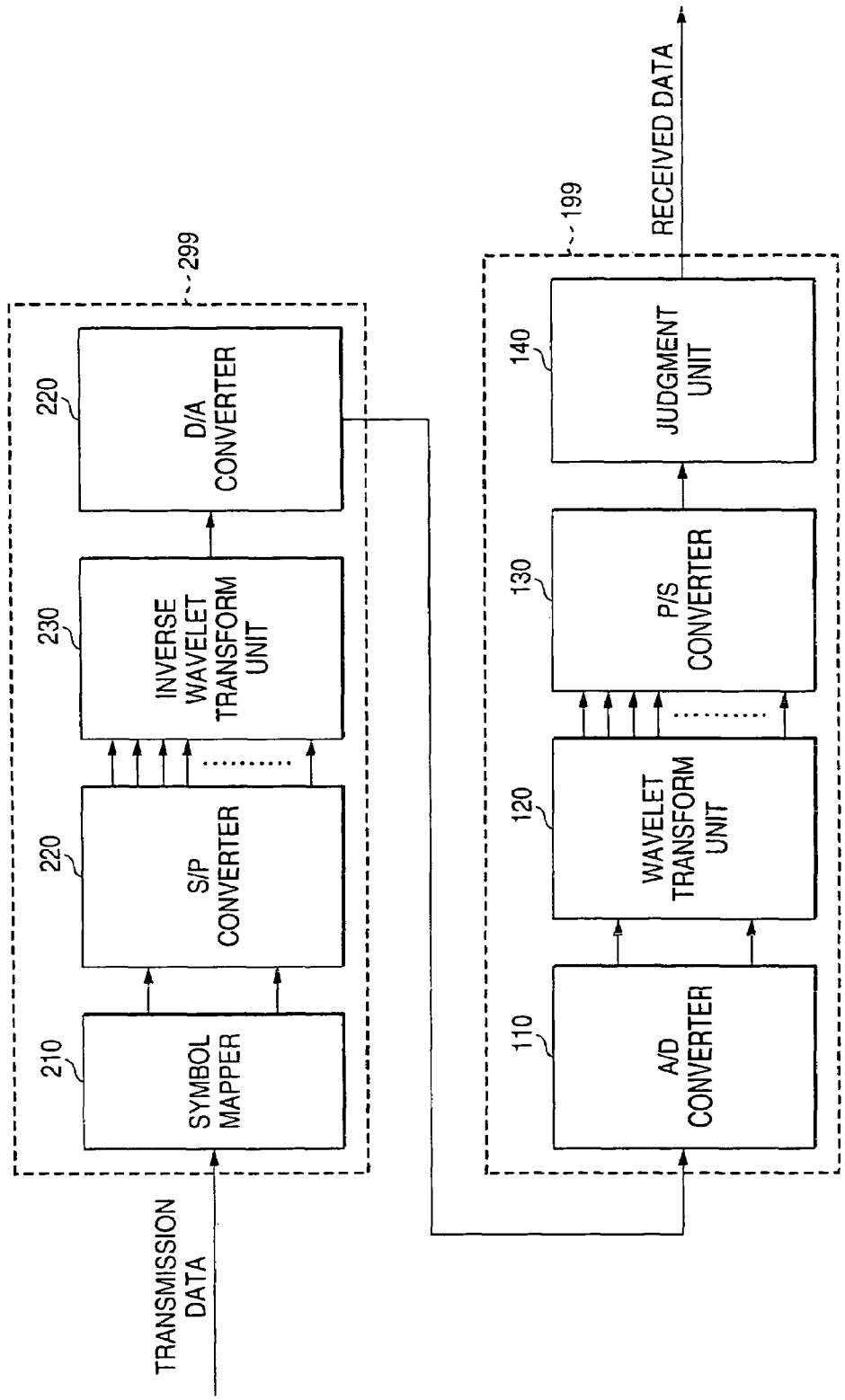
FIG. 19 is a block diagram which shows a conceptual configuration of a communication apparatus as a past example, which has a transmitting device and a receiving device in case that the DWMC transmission method was adopted.

Next, generation of a pilot symbol according to this embodiment will be described. FIG. 3 is a view which schematically shows a part of a transmission frame on a time axis in the first embodiment. FIG. 3 shows a part of an information symbol in a transmission frame shown in FIG. 18.

As shown in FIG. 3, in case that a filter length of wavelet (a filter length of the FIR filter 36 in FIG. 2) is composed of K symbols, a pilot symbol P is composed of contiguous identical data (e.g., all 1, all 0, etc.) for 2K−1 symbols at a transmitting side. Meanwhile, in FIG. 3 and explanation of the embodiment of the invention, it will be described, taking a case of a wavelet's filter length K=4 symbols, as an example.

Here, in case of a past multi carrier transmission system which depends on FFT based OFDM, a wavelength of one symbol length is obtained in accordance with a data signal of one symbol. Therefore, a sine wave signal is obtained by a pilot symbol which was configured by contiguous identical data for one symbol, and therefore, it is possible to configure a pilot symbol by one symbol.

On one hand, in case of wavelet based OFDM, as described in FIG. 2, data is transmitted by use of a filter bank which includes a filter having a predetermined filter length. On that account, as shown in FIG. 3, wavelet wave forms with a length of K symbols are transmitted to a data signal of one symbol, with a shift of one symbol length at a time.

For example, as shown in FIG. 3, a wavelet wave form WD1 of data which was given to a symbol D1 is transmitted with wave forms for 4 symbols. Then, a receiving side can demodulate a data signal D1, by receiving this wave form WD1 for 4 symbols.

Here, it is not possible to obtain a sine wave by simply inserting only contiguous identical data P1, due to influence of a wavelet wave form of data which was given to previous and next symbols, and therefore, it is not possible to use information of a point of a signal which was demodulated at a receiving side, as a pilot signal, without modification.

Consequently, in this embodiment, a pilot symbol is composed of contiguous identical data of 2K−1 symbols, and the pilot symbol is inserted into the transmission frame (transmission signal). The symbols P4 through P7 which show sine waves, i.e., later K symbols among them are subjected wavelet transformation, then, its signal point is used as a pilot symbol.

Firstly, in a 4-th symbol (K-th symbol) of contiguous identical data P1 through P4, it becomes difficult to have an influence of a wavelet wave form WD2 which depends on transmission data, and only contiguous identical data enters into a wavelet filter, and therefore, a time wave form becomes a sine wave. Then, a wavelet wave form WP4 of contiguous identical data of that P4 has further a length of 4 symbols (K symbols), and therefore, it is configured so as for a time wave form to show a side wave in the symbols P4 through P7, by giving contiguous identical data to the symbols P4 through P7 for 4 symbols' filter lengths including the 4-th symbol P4. Then, by wavelet converting these symbols P4 through P7 which have become sine waves, it is possible to use them as a pilot symbol.

Then, on the basis of this extracted pilot symbol, equalization of a channel is carried out by a channel equalizer in such a manner that a transmission frequency characteristic such as a phase and frequency is estimated, and a demodulated signal is controlled by use of its inverse characteristic, and so on.

In this manner, according to the first embodiment, a pilot symbol, which can handle complex information for channel equalization, can be configured by a pilot symbol which was generated by giving contiguous identical data across continuing 2K−1 symbols, and can be used. In addition, by carrying out equalization of a channel through the use of information of a pilot symbol, it is possible to follow channel characteristic fluctuation.

Meanwhile, this embodiment described such a case that a pilot symbol is composed of 2K−1 symbols to which contiguous identical data was given, but it is all right if they are 2K−1 symbols or more. In addition, in the receiving device, if a K-th symbol or later is demodulated in a pilot symbol of 2K−1 symbols or more, it is possible to obtain complex information.

Figure 22B:
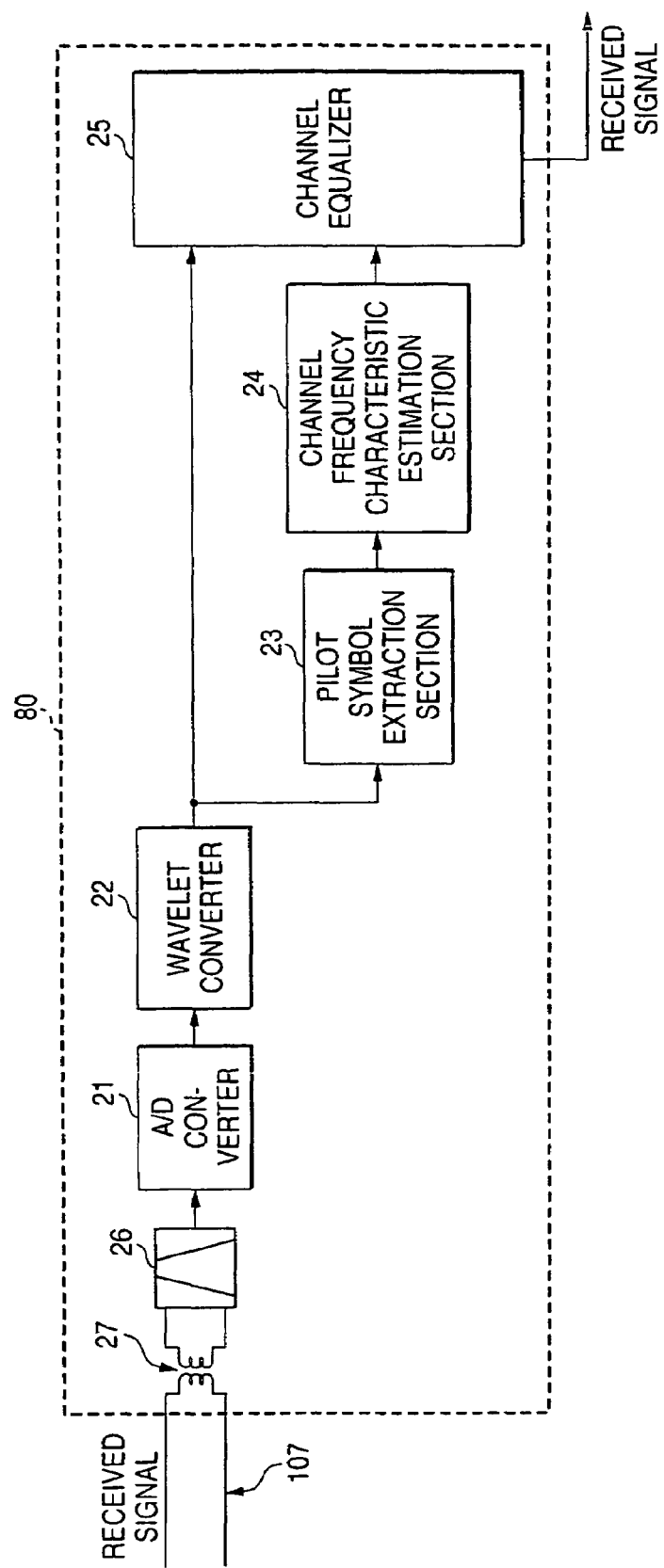

FIGS. 22A and 22B are block diagrams which show a modified example of a configuration of a communication apparatus which uses a power line as a channel. Particularly, FIG. 22A shows a transmitting device, and FIG. 22B shows a receiving device. In the transmitting device and the receiving device shown in FIGS. 22A and 22B, identical reference numerals and signs are applied to identical elements to those of the transmitting device and the receiving device shown in FIGS. 1A and 1B, and thereby, explanations thereof will be omitted. A transmitting device 70 of FIG. 22A has BPF (Band Pass Filter) 17 and a coupler transformer 18, in addition to each element of the transmitting device of FIG. 1A. The coupler transformer 18 is connected to the power line 107. In addition, a receiving device 80 of FIG. 22B has BPF 26 and a coupler transformer 27, in addition to each element of the receiving device of FIG. 1B. The coupler transformer 27 is connected to the power line 107.

The transmission data output section 11, the pilot data output section 12, the switch 13, the symbol mapper 14, and the inverse wavelet transformer 15 are configured by a MAC/PHY-IC chip (not shown in the figure) which carries out management of a MAC (Media Access Control) level and a PHY (Physical) layer. The D/A converter 16 and BPF 17 are configured by an AFE (Analog Front End) IC chip (not shown in the figure).

In the transmitting device 70, when the D/A converter 16 outputs analog base band signal wave forms, BPF 17 gets through transmission wave forms in a predetermined frequency band. The coupler transformer 18 overlaps the transmission wave forms from BPF 17 with the alternating voltage, and transmits them through the power line 107. On one hand, in the receiving device 80, when signals, which were transmitted through the power line 107, have been received, the coupler transformer 27 separates the received signals from the alternating voltage, and BPF 26 gets through received signals in a predetermined frequency band. The A/D converter 21 samples analog base band signal wave forms which are obtained from the received signals, and will hereinafter carry out the same processing as that of the receiving device of FIG. 1B.

The wavelet transformer 22, the pilot symbol extraction section 23, the channel frequency characteristic estimator 24, and the channel equalizer 25 are configured by a MAC/PHY-IC chip (not shown in the figure) which carries out management of a MAC (Media Access Control) level and a PHY (Physical) layer. The A/D converter 21 and BPF 26 are configured by an AFE (Analog Front End) IC chip (not shown in the figure).

Meanwhile, in the transmitting device 70, the D/A converter 16, BPF 17, and the coupler transformer 18 are one which has a function of a transmission section. In the receiving device 80, the coupler transformer 27, BPF 26, and the A/D converter 21 are one which has a function of a receiving section.

Second Embodiment

Figure 4:
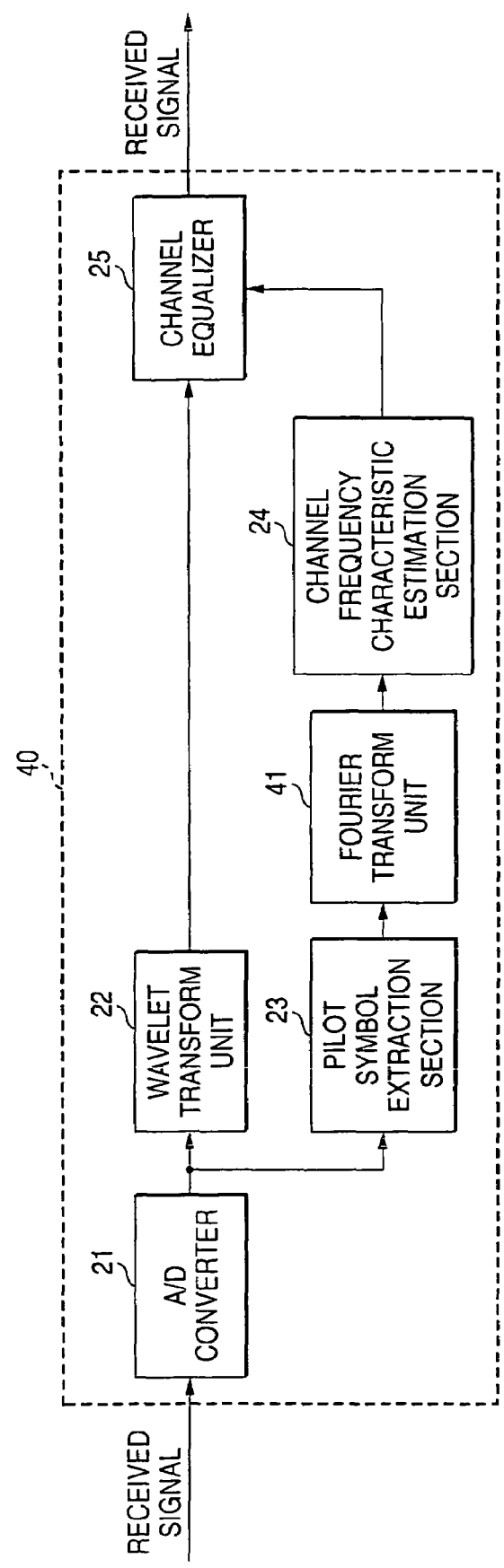
FIG. 4 is a block diagram which shows a major configuration of a receiving device in a second embodiment of the invention.

FIG. 4 is a block diagram which shows a major configuration of a receiving device which relates to a second embodiment of the invention. Meanwhile, identical reference numerals and signs are given to similar constituent elements to those in the first embodiment 1.

A receiving device 40 in the second embodiment is configured by having a Fourier transform unit 41 which carries out Fourier transformation to a symbol extracted by a pilot symbol extraction section 23, together with an A/D converter 21, a wavelet transform unit 22, the pilot symbol extraction section 23, a channel frequency characteristic estimation section 24, and a channel equalizer 25. Meanwhile, in the receiving device 40, the Fourier transform unit 41 is one which has a function of Fourier transformer.

Figure 5:
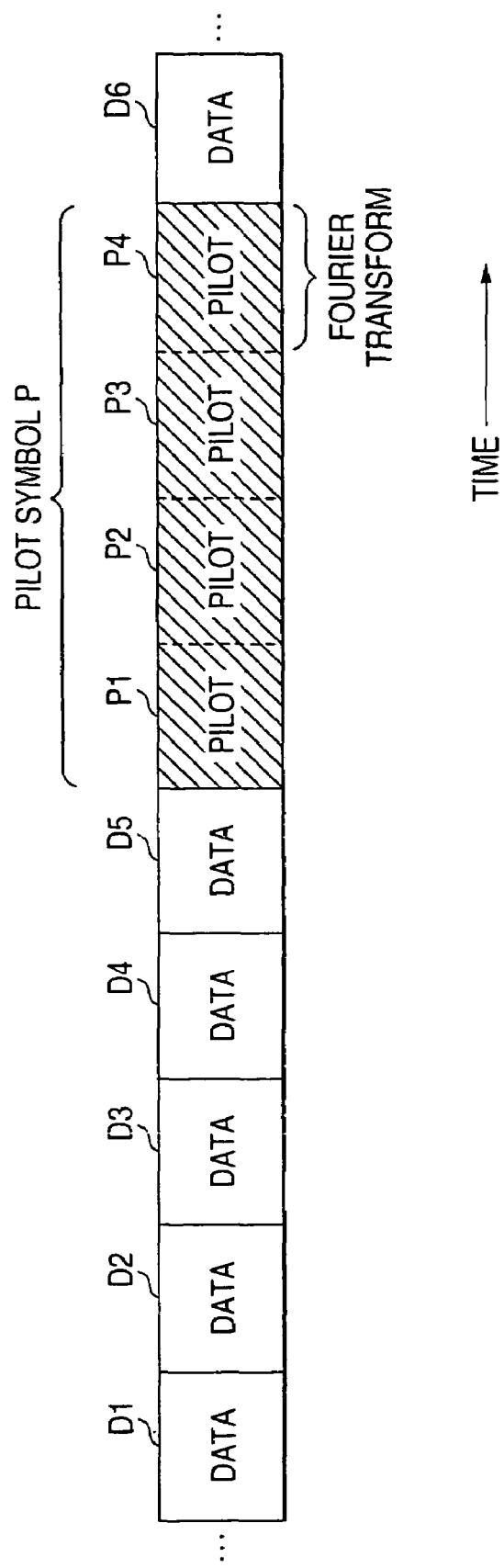
FIG. 5 is a view which schematically shows a part of a transmission frame on a time axis in the second embodiment.

Next, generation of a pilot symbol according to this embodiment will be described. FIG. 5 is a view which schematically shows a part of a transmission frame on a time axis in the second embodiment. In this embodiment, in case of disposing a pilot symbol in data transmission by use of the DWMC transmission system and in case that a filter length of wavelet is composed of K symbols, contiguous identical data (e.g., all 1, all 0, etc.) for K symbols is given in a transmitting side, and a K-th symbol, among that continuing K symbols, is Fourier transformed in a receiving side, and thereby, it becomes possible to directly handle demodulated signal points as polar coordinates. Meanwhile, as shown in FIG. 5, in this embodiment, a case of a filter length K=4 will be described as example.

As shown in FIG. 3, an influence of a wave form due to transmission data prior to pilot data is applied up to a 3-rd symbol ((K−1)-th symbol), but an influence of a wave form due to transmission data prior to pilot data is not applied to pilot data P4 of a 4-th symbol (K-th symbol), and therefore, a sine wave signal is obtained.

However, in case of obtaining a demodulated signal by carrying out wavelet transformation, in order to obtain a sine wave signal for a filter length, contiguous identical data of 3 symbols (K−1 symbols) is further required, but in this embodiment, only one symbol of the symbol P4, which becomes a sine wave as a time wave form, is Fourier transformed, and thereby, complex is obtained from that demodulated signal point information. On the basis of that complex information, estimation of a channel characteristic is carried out by the channel frequency characteristic estimation section 24, and channel equalization is carried out by the channel equalizer 25.

In this manner, according to the second embodiment, it is possible to configure a pilot symbol as described above, and to configure a pilot symbol with the same symbol number as a filter length of wavelet.

Third Embodiment

Figure 6:
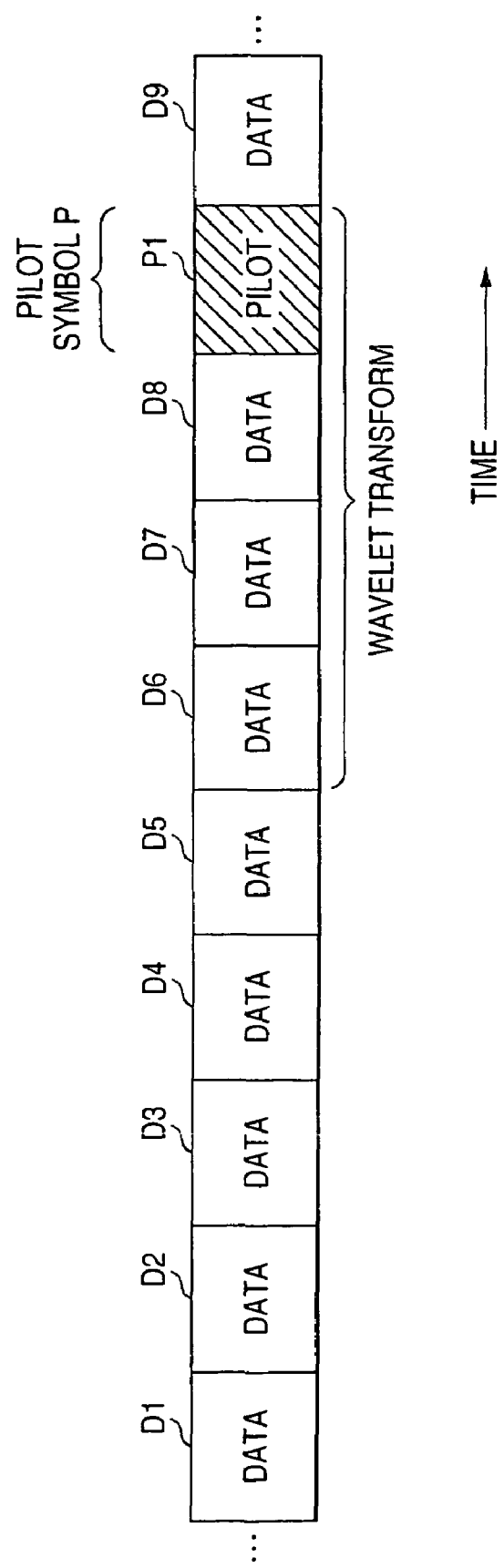
FIG. 6 is a view which schematically shows a part of a transmission frame on a time axis in a third embodiment of the invention.

FIG. 6 is a view which schematically shows a part of a transmission frame on a time axis in a third embodiment of the invention. A major configuration of a communication apparatus of this embodiment is almost the same as that of the first embodiment which was described in FIG. 1.

As shown in FIG. 6, in the third embodiment, a transmitting device configures a pilot symbol P by use of contiguous identical data P1 for one symbol, and transmits it to a receiving device.

However, in this case, even if the pilot symbol P is composed of one symbol of only the contiguous identical data P1, a sine wave is not obtained, and therefore, complex information is not obtained from its demodulated signal point information without modification. Consequently, in the third embodiment, in a channel frequency characteristic estimation section 20, complex information is calculated on the basis of demodulated signal point information between adjacent sub carriers. Meanwhile, the channel frequency characteristic estimation section 20 in this embodiment has a function of complex information estimator.

Figure 7:
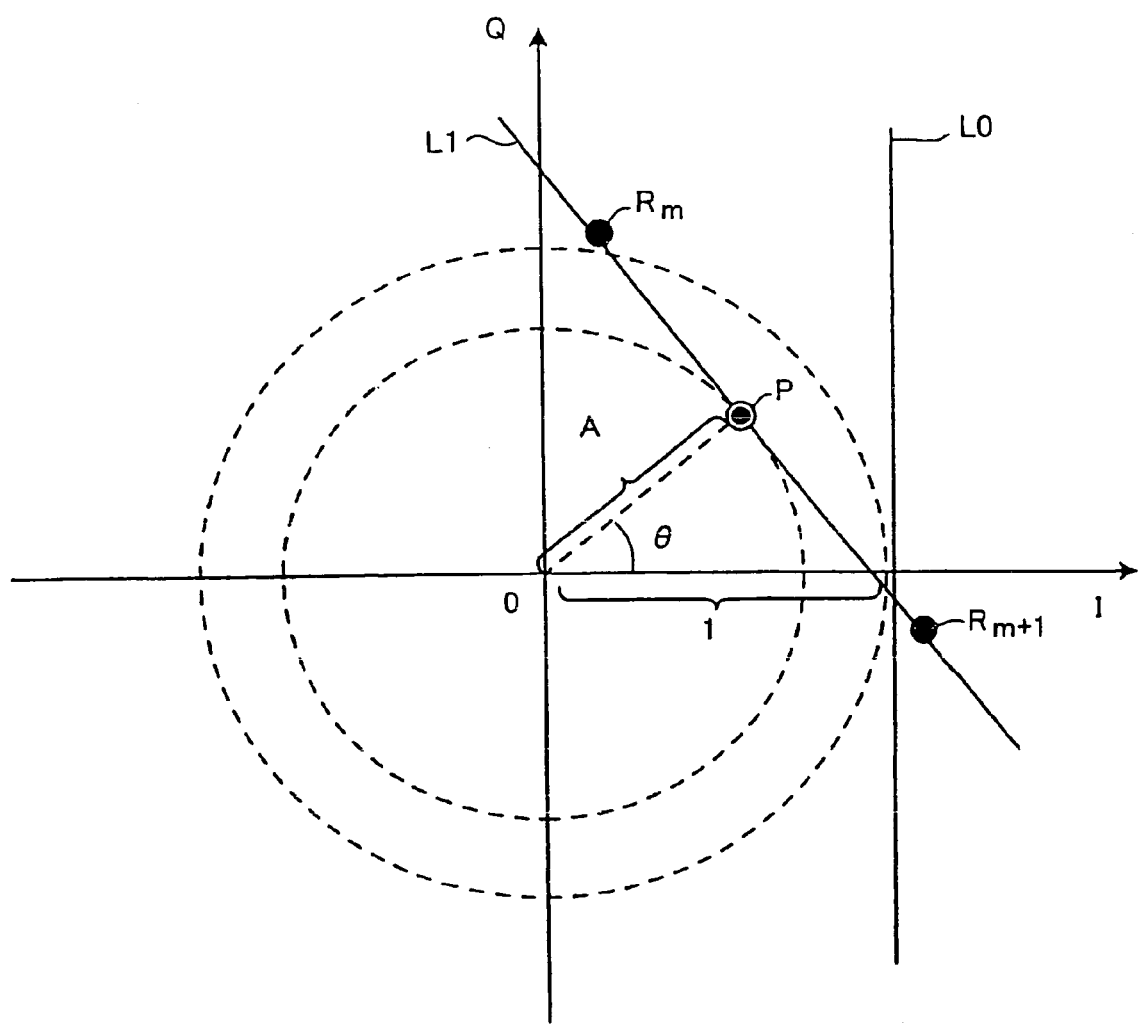
FIG. 7 is a view which shows a calculation example of complex information on an orthogonal plane in the third embodiment.

FIG. 7 is a view which shows a calculation example of complex information on an orthogonal plane in the third embodiment. As shown in FIG. 7, it is assumed that a demodulation signal point in a sub carrier m is $R_m$, and a demodulated signal point in a sub carrier m+1 which is adjacent to the sub carrier m is $R_{m+1}$. Then, a straight line L1, which runs through the point $R_m$ and the point $R_{m+1}$, is made. Then, as to an intersection point P of a perpendicular line, which was made from an original point O to the straight line L1, and the straight line L1, obtained is complex information in which a distance A between the point P and the original point P was used as an amplitude, and an angle θ, which is made by an I axis and a line segment OP, was used as a phase. Then, the channel frequency characteristic estimation section 24 estimates a frequency characteristic of a channel on the basis of this complex information, and the channel equalizer 25 carries out equalization of the channel on the basis of that channel characteristic.

Meanwhile, a straight line L0 shows an area in which a demodulated signal point exists in case that synchronization was carried out accurately. In the example shown in FIG. 7, the straight line L1 is deviated from the straight line L0. This represents that an amplitude and a phase are fluctuating by an actual channel characteristic.

In this manner, according to the third embodiment, it is possible to configure a pilot symbol, which can handle complex information for channel equalization, with the use of at leas one symbol, by calculating complex information from demodulation signal point information of adjacent sub carriers.

Fourth Embodiment

FIG. 8 is a view which schematically shows a part of a transmission frame on a time axis in a fourth embodiment of the invention. A major configuration of a communication apparatus in this embodiment is almost the same as that of the first embodiment which was described in FIG. 1. In addition, In FIG. 8, as one example of the filter length K of wavelet, a case of 4 symbols will be described.

As shown in FIG. 8, in the fourth embodiment, a transmitting device configures a pilot symbol P by use of contiguous identical data P1 through P3 for 3 symbols (K−1 symbols), and transmits it to a receiving device. Then, the receiving device obtains complex information by use of such a demodulated signal point that K−1 symbol P3 of the pilot symbol was wavelet transformed.

However, since the contiguous identical data P1 through P3 are less than 4 symbols as a filter length, even if the pilot symbol P is composed of 3 symbols of P1 through P3, a sine wave is not obtained, and it is not possible to use it as a channel characteristic as it is, from that demodulated signal point information.

Consequently, in the fourth embodiment, in the same manner as the third embodiment, in the channel frequency characteristic estimation section 20, complex information is calculated on the basis of demodulated signal point information between adjacent sub carriers. Further, in this embodiment, a pilot symbol is configured by use of contiguous identical data for K−1 symbols.

Figure 9A:
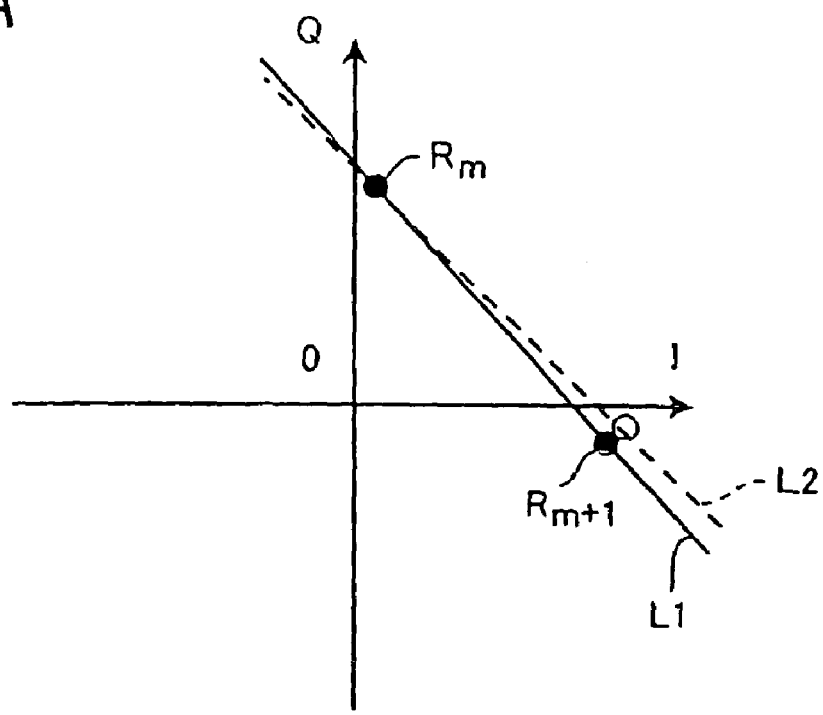
FIGS. 9A and 9B are views which show a calculation example of complex information on an orthogonal plane in the fourth embodiment.
Figure 9B:
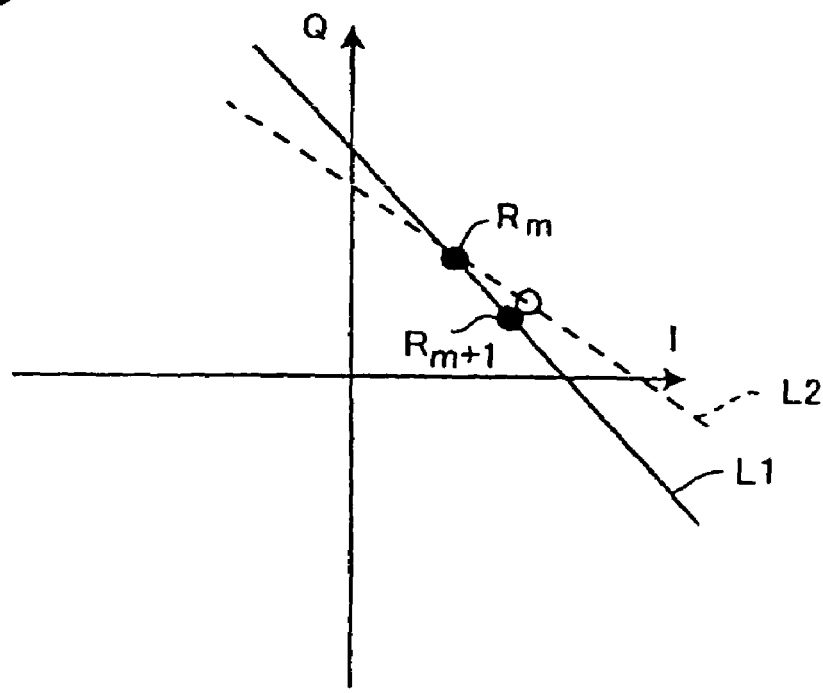

FIGS. 9A and 9B are view which shows a calculation example of complex information on an orthogonal plane in the fourth embodiment. Particularly, FIG. 9A is a view which shows such a case that a 3-rd symbol P3 ((K−1)-th symbol) of a pilot symbol, which is configured by 3 symbols (K−1), was wavelet transformed, and FIG. 9B shows such a case that ones other than the 3-rd symbol ((K−1)-th symbol) were wavelet transformed.

Here, the more the number of symbols of contiguous identical data, which configures a pilot symbol, comes close to the filter length K symbols, the more a wave length to be obtained comes close to a sine wave. Here, signal points of adjacent sub channels, in case that a sine wave was demodulated, become +1 and −1, respectively. Therefore, in case that symbols of contiguous identical data are given continuously, a later symbol comes close to a sine wave, and therefore, a distance between signal points of adjacent sub channels is broden.

At this time, as shown in FIGS. 9A and 9B, the wider a distance between two signal point information $R_m$ and $R_{m+1}$ is, the fewer a deviance of the straight line L1 due to an error of a demodulated signal point becomes. For example, a straight line L2 is one showing such a case that there is no error of signal points, and in FIG. 9A, since two signal points are displaced, there is few deviance of the straight lines L1 and L2 due to an error of a signal point, but in FIG. 9B, since two signal points are close, deviance of the straight line L1 and the straight line L2 is enlarged due to an error of a signal point. Therefore, by configuring a pilot symbol in such a manner that two demodulated signal points have a fixed distance or more, it is possible to reduce an error of a point P for obtaining complex information, and therefore, it is possible to improve accuracy of channel characteristic estimation.

In this manner, according to the fourth embodiment, it is possible to carry out channel characteristic estimation with high accuracy, even in case that a pilot symbol, which can handle complex information for channel equalization, was configured by the number of symbols which is less than the filter length K symbols, by calculating complex information from demodulated signal point information of adjacent sub carriers.

Fifth Embodiment

Figure 10:
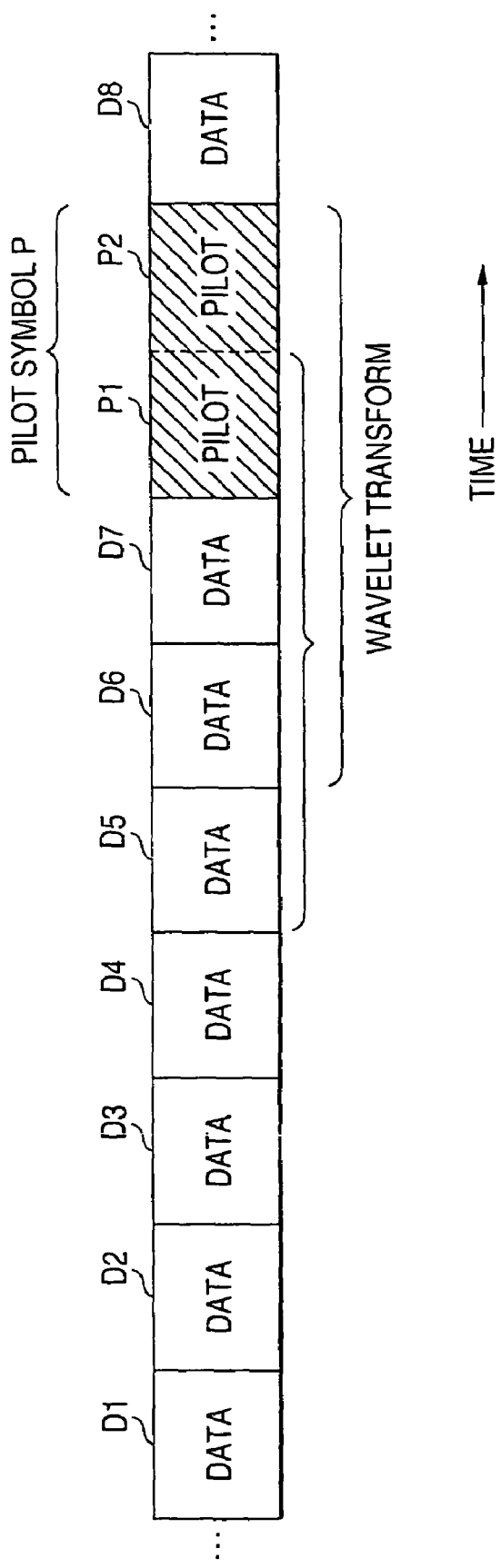
FIG. 10 is a view which schematically shows a part of a transmission frame on a time axis in a fifth embodiment of the invention.

FIG. 10 is a view which schematically shows a part of a transmission frame on a time axis in a fifth embodiment of the invention. A major configuration of a communication apparatus of this embodiment is almost the same as that of the first embodiment which was described in FIG. 1.

As shown in FIG. 10, in the fifth embodiment, a transmitting device configures a pilot symbols P by contiguous identical data P1, P2 for 2 symbols, and transmits it to a receiving device.

However, in this case, even if the pilot symbol P is configured by 2 symbols of only contiguous identical data P1, P2, it is less than 4(K) symbols of a filter length, and therefore, even if the pilot symbol P is configured by 3 symbols of P1 through P3, a sine wave is not obtained, and it is not possible to use it from its demodulated signal point information as it is, as a channel characteristic. Consequently, in the fifth embodiment, in a channel frequency characteristic estimation section 20, as to ones that the contiguous identical data P1, P2 were wavelet transformed respectively, complex information is calculated on the basis of demodulated signal point information of an identical sub carrier.

Figure 11:
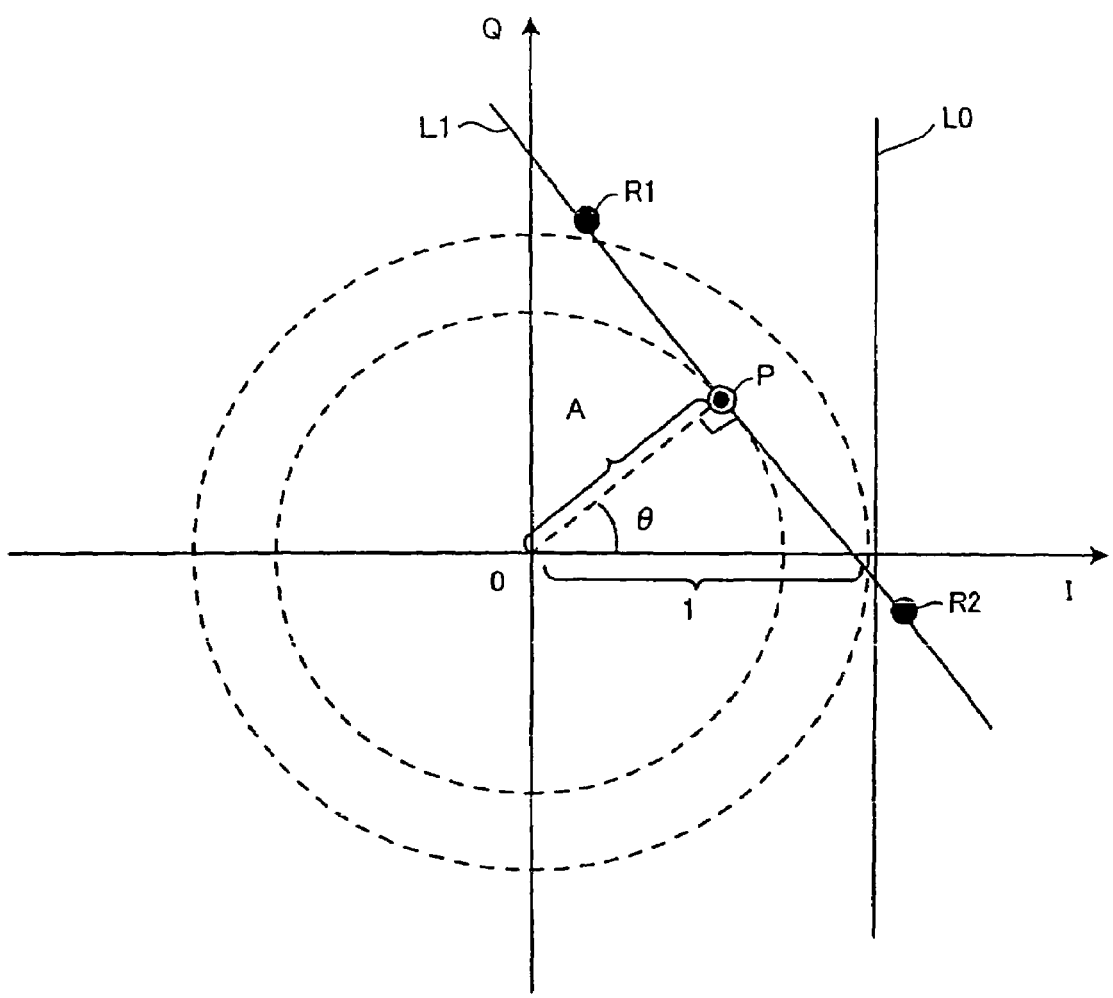
FIG. 11 is a view which shows a calculation example of complex information on an orthogonal plane in the fifth embodiment.

FIG. 11 is a view which shows a calculation example of complex information on an orthogonal plane in the fifth embodiment. As shown in FIG. 11, it is assumed that a demodulated signal point of a first symbol P1 in a sub carrier m is R1, and a demodulated signal point of a second symbol P2 in the sub carrier m is R2. Then, a straight line L1, which runs through the point R1 and the point R2, is made. Then, as to an intersection point P of a perpendicular line, which was made from an original point O to the straight line L1, and the straight line L1, obtained is complex information in which a distance A between the point P and the original point P was used as an amplitude, and an angle θ, which is made by an I axis and a line segment OP, was used as a phase. Then, the channel frequency characteristic estimation section 24 estimates a frequency characteristic of a channel on the basis of this complex information, and updates equalization information of a channel equalizer 25.

Meanwhile, a straight line L0 shows an area in which a demodulated signal point exists in case that synchronization was carried out accurately. In the example shown in FIG. 11, the straight line L1 is deviated from the straight line L0. This represents that an amplitude and a phase are fluctuating by an actual channel characteristic.

In this manner, according to the fifth embodiment, it is possible to configure a pilot symbol, which can handle complex information for channel equalization, with the use of at leas two symbols, by calculating complex information from demodulation signal point information of at least two sub carriers. In addition, since complex information is calculated by use of demodulated signal point information of an identical sub carrier, it is possible to obtain complex information with respect to each sub carrier.

Meanwhile, in this embodiment, a pilot symbol was configured by contiguous two symbols P1, P2, and there is not necessarily such a necessity that symbols, which configure a pilot symbol, are continuing. In this regard, however, it is desirable that they are continuing in case that an influence of disturbance etc. was taken into consideration.

Sixth Embodiment

A sixth embodiment can improve accuracy of division in fixed point calculation, or can reduce a circuit size of a divider, by carrying out quadrant correction from a relation of two demodulated signal points, so as for a scope of inclination a to become $-1 \leq a \leq 1$, on the occasion of obtaining inclination a of the straight line L1 in the third through fifth embodiments.

For example, in case that a status of a channel is good, inclination of the straight line L0 shown in FIG. 7 and FIG. 11 becomes a value which is close to infinity, and a bit width for representing that inclination becomes very large at the time of calculation, which will invite increase of a calculation amount and increase of a circuit size.

Consequently, in this embodiment, quadrant correction is carried out so as for a threshold value of inclination of the straight line L1 showing a channel characteristic to become 1. Here, it is assumed that coordinates of two demodulated signal points (the points $R_m$ and $R_{m+1}$ in FIG. 7, FIG. 9, and the points R1 and R2 in FIG. 11) are set to (x0, y0), (x1, y1), respectively. Meanwhile, it is assumed that a coordinate in an I axis direction is x, and a coordinate in a Q axis direction is y.

Firstly, |x1−x0| and |y1−y0| are obtained, respectively. Next, inclination a and segment b of a straight line (the straight line L1 in FIG. 7, FIG. 9, FIG. 11) are obtained by the following formulas (1) through (4).

In case of |y1−y0|≦|x1−x0| (hereinafter, Case 1), $$a=(y1-y0)/(x1-x0) \qquad (1)$$

$$b=y1-a.x1 \text{ or } b=y0-a.x0 \qquad (2)$$

In case of |y1−y0|>|x1−x0| (hereinafter, Case 2), $$a=(x1-x0)/(y1-y0) \qquad (3)$$

$$b=x1-a.y1 \text{ or } b=x0-a.y0 \qquad (4)$$

Therefore, a scope of the inclination a, which is used for calculation, becomes −1≦a≦1. That is, in the case 2, the inclination a and the segment b become inverse functions of the straight line L1. Next, a phase θ of a channel characteristic is obtained by the following formulas (5) through (8).

In case of the case 1 and the segment b>0, $$\theta=\tan^{-1}(a) \qquad (5)$$

in case of the case 1 and the segment b<0, $$\theta=\tan^{-1}(a)+\pi \qquad (6)$$

In case of the case 2 and the segment b≧0, $$\theta=\tan^{-1}(a)+\pi/2 \qquad (7)$$

in case of the case 2 and the segment b<0, $$\theta=\tan^{-1}(a)-\pi/2 \qquad (8)$$

In addition, an amplitude A of a channel characteristic is obtained by the following formula (9).

$$A=|b|/(a^2+1)^{1/2} \qquad (9)$$

In this manner, according to the six embodiment, it is possible to improve accuracy of division in fixed point calculation, and to reduce a circuit size of a divider, by suppressing inclination of a straight line, which is obtained from two or more demodulated signal point information within a predetermined value.

Seventh Embodiment

FIGS. 12A and 12B are view which schematically shows a part of a transmission frame on a time axis in a seventh embodiment of the invention. A major configuration of a communication apparatus of this embodiment is almost the same as that of the first embodiment which was descried in FIG. 1.

In the seventh embodiment, a configuration for taking the average of complex information for N symbols, in order to improve accuracy more, in the first through fifth embodiments, will be described. FIG. 12A shows a case of taking the average of complex information which is obtained from demodulated signal points of two symbols, in the example of the fourth embodiment which was described in FIG. 8, and FIG. 12B shows a case of taking the average of complex information by use of demodulated signal point information of 2 symbols, in the example of the second embodiment which was described in FIG. 4.

In a transmitting device 10, in case of taking the average of N symbols, contiguous identical data of N−1 symbols are further added to a pilot symbol. In an example of FIG. 12A, since the average of 2 symbols is taken, contiguous identical data of 2−1=1 symbol (K−1 symbols) is added, in addition to contiguous identical data of 3 symbols in case of not taking the average. In addition, in an example of FIG. 12B, contiguous identical data of 2−1=1 symbol is added, in addition of contiguous identical data of 4 symbols in case of not taking the average.

In a receiving device 20, as shown in FIGS. 12A and 12B, since contiguous identical data of 1 symbol is added to a pilot symbol, firstly, demodulation is carried out as to symbols to be demodulated originally, to obtain complex information, and furthermore, demodulation is carried out with shifting an 1 symbol portion to obtain complex information. Then, the average of these two complex information is taken by a channel frequency characteristic estimation section, and estimation of a channel characteristic is carried out.

In this manner, according to the seventh embodiment, it is possible to improve accuracy of complex information, and to improve channel characteristic estimation accuracy, since a channel characteristic is estimated from the average of a plurality of complex information.

Eighth Embodiment

Figure 13A:
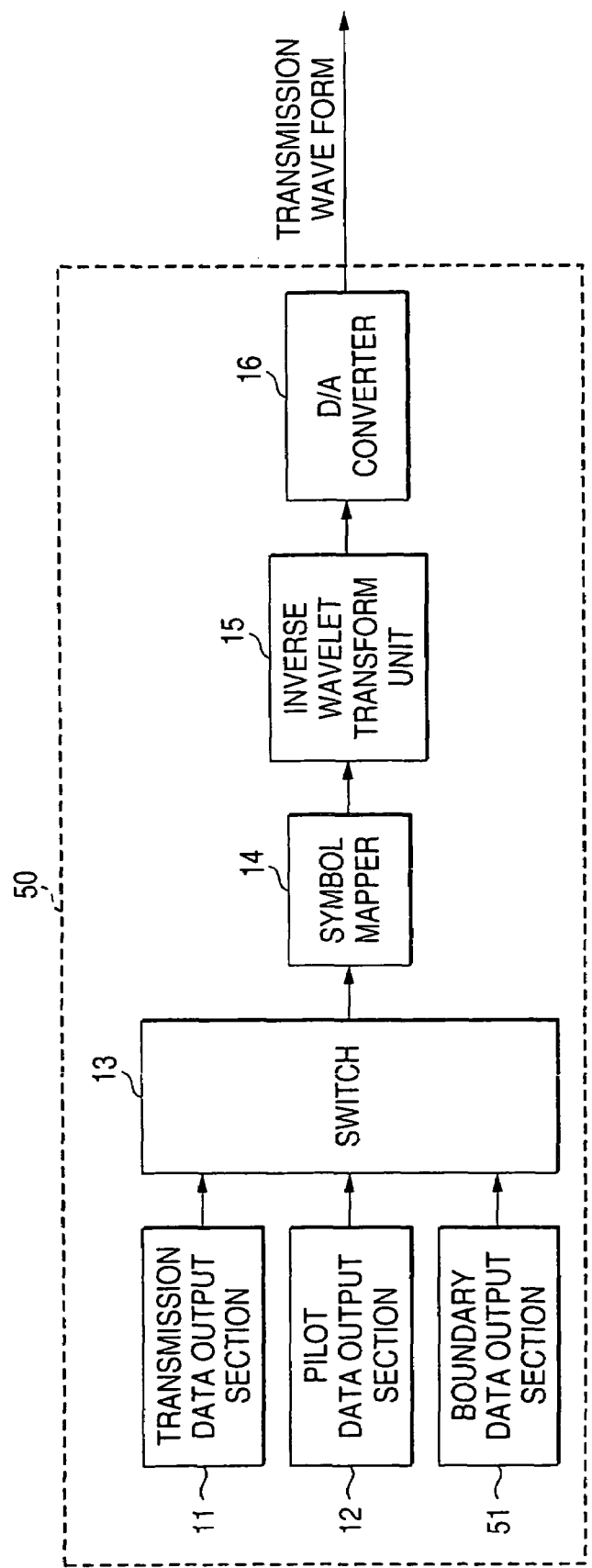
FIGS. 13A and 13B are block diagrams which show a major configuration of a communication apparatus which relates to an eighth embodiment of the invention.
Figure 13B:
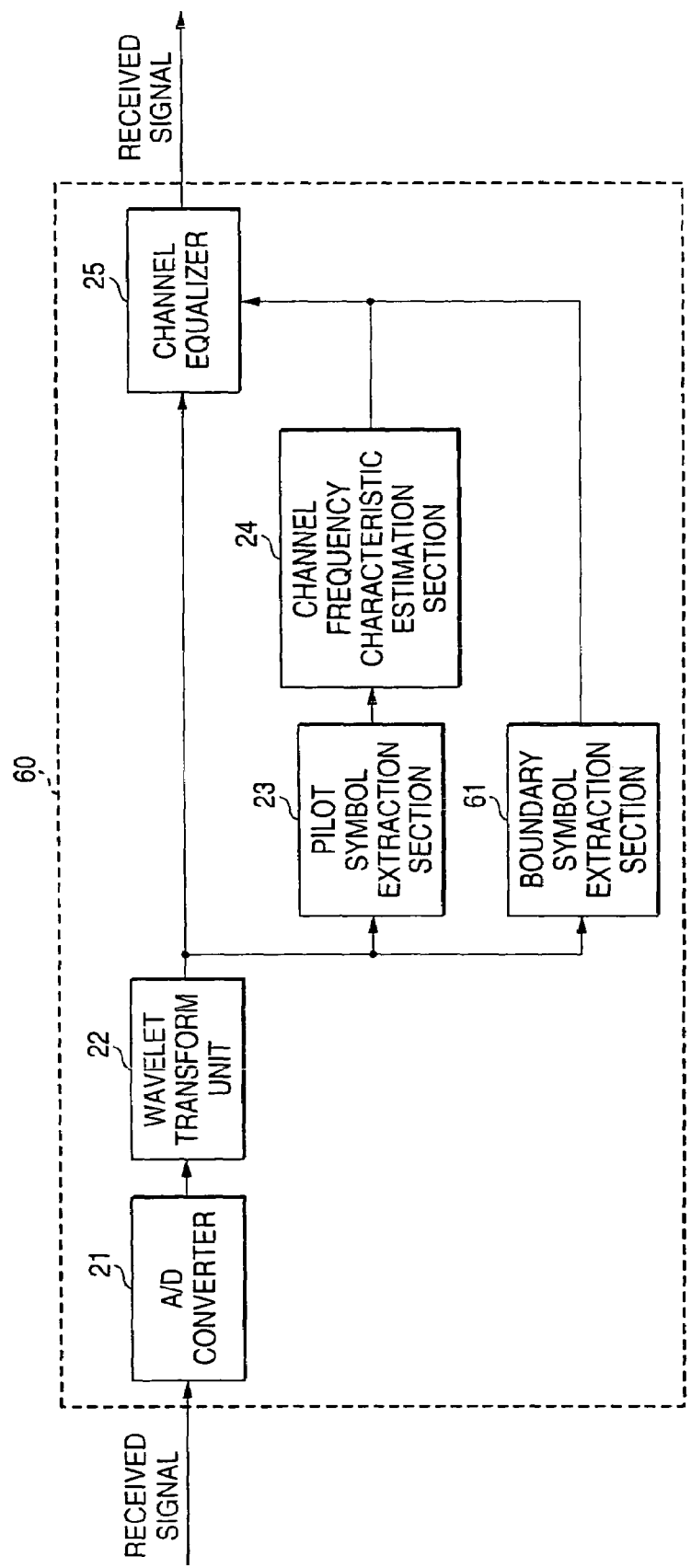

FIGS. 13A and 13B are block diagrams which shows a major configuration of a communication apparatus which relates to an eighth embodiment of the invention. Particularly, FIG. 13A is a block diagram which shows a transmitting device which configures the communication apparatus, and FIG. 13B is a block diagram which shows a receiving device which configures the communication apparatus. Meanwhile, identical reference numerals and signs are given to constituent elements which are similar to those in the first embodiment.

A transmitting device 50 in the eighth embodiment is configured by having a boundary data output section 51 which outputs boundary data, together with a transmission data output section 11, a pilot data output section 12, a switch 13, a symbol mapper 14, an inverse wavelet transform unit 15, a D/A converter 16. Meanwhile, in the transmitting device 50, the boundary data output section 51 and the switch 13 have a function of boundary symbol output means.

In addition, a receiving device 60 is configured by having a boundary symbol extraction section 61 which extracts a boundary symbol from a received signal, together with an A/D converter 21, a wavelet transform unit 22, a pilot symbol extraction section 23, a channel frequency characteristic estimation section 24, and a channel equalizer 25. Meanwhile, in the receiving device 60, the boundary symbol extraction section 61 has a function of boundary symbol extraction means.

Figure 14:
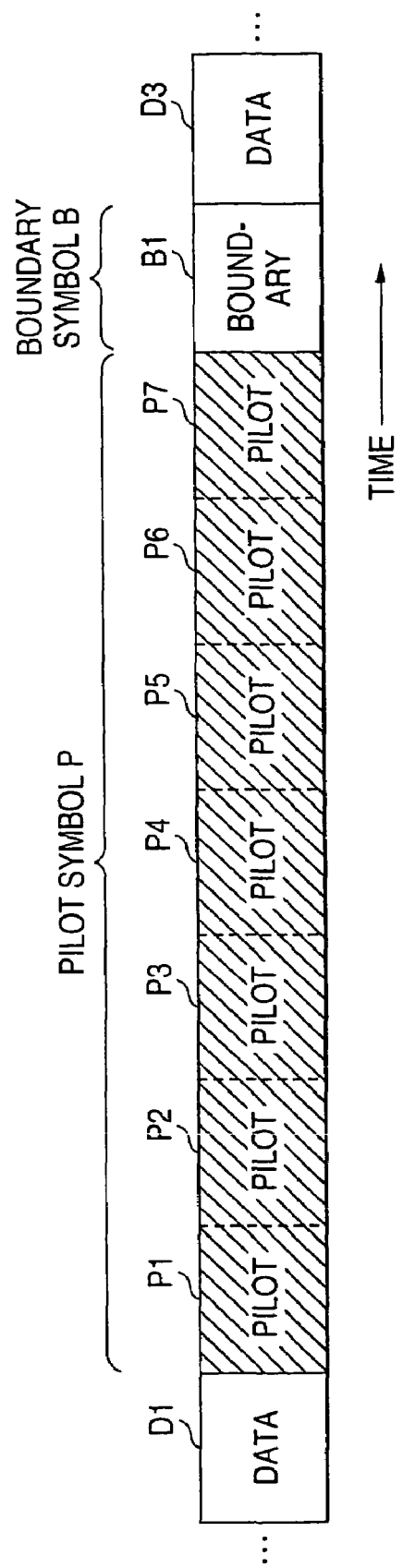
FIG. 14 is a view which schematically shows a part of a transmission frame on a time axis in the eighth embodiment.
Figure 15:
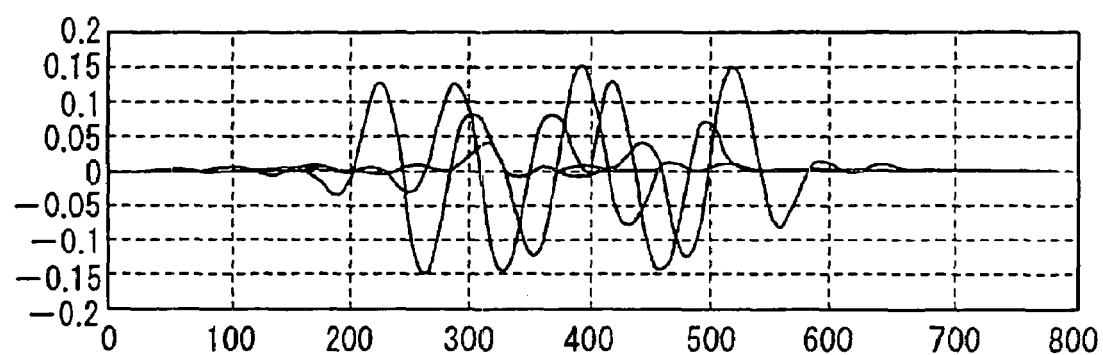
FIG. 15 is a view which shows an example of a wavelet wave form.
Figure 16:
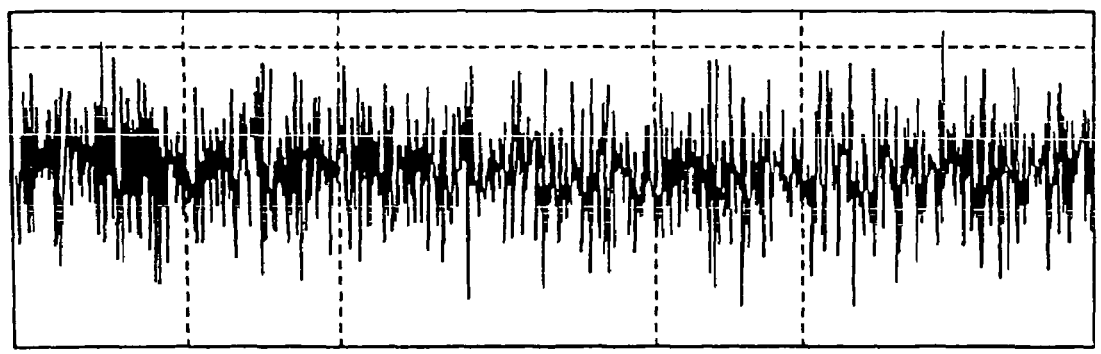
FIG. 16 is a view which shows an example of a transmission wave form in a DWMC transmission method.
Figure 17:
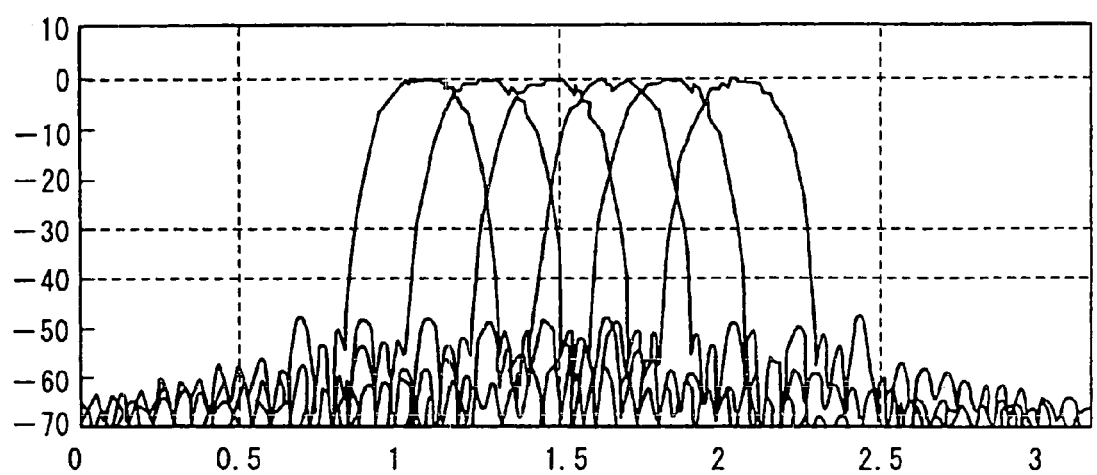
FIG. 17 is a view which shows an example of a transmission spectrum in the DWMC transmission method.

FIG. 14 is a view which schematically shows a part of a transmission frame on a time axis in the eighth embodiment. As shown in FIG. 14, in this embodiment, in case of disposing a pilot symbol in data transmission by use of the DWMC transmission method, a boundary symbol B, to which a known signal B 1, which is different from a known signal to be given to a pilot symbol, was given, is inserted between a pilot symbol and a data symbol.

The receiving device 60 extract a boundary symbol from received signals in the boundary symbol extraction section 61, and the channel equalizer 25 estimates a channel characteristic by a pilot symbol, when it detects a boundary symbol, and starts equalization of a channel.

In case that a synchronization position varies widely by an abrupt change of a channel, there occurs such a case that it is not possible to accurately get hold of a boundary of a pilot symbol and a data symbol in the receiving device side. Therefore, in this embodiment, even if a synchronization position varies widely in this manner, it is possible to fit a synchronization position, by use of the boundary symbol.

It becomes possible to make this boundary symbol hold a function which has a resemblance to that of a synchronization symbol of a transmission frame, but it is possible to take synchronization even in a information symbol, and therefore, it becomes possible to fit a synchronization position without carrying out a re-transmit request, and it is possible to follow fluctuation of a channel without lowering transmission efficiency.

In this manner, according to the eighth embodiment, it is possible to accurately follow abrupt channel fluctuation, since a boundary symbol is disposed between a pilot symbol and a data symbol, and demodulation of the pilot symbol is carried out on the basis of that boundary symbol.

Meanwhile, in the above-described each embodiment, contiguous identical data, which configures a pilot symbol, is given to all multi carriers. It is possible to carry out channel equalization processing to all multi carriers, by transmitting a known signal to all carriers.

In addition, as to a pilot symbol in each embodiment and also, a boundary symbol in the eighth embodiment, insertion, non-insertion may be determined, in accordance with a status of a channel which is detected in the receiving device. In addition, an insertion distance of a pilot symbol and/or a boundary symbol may be determined.

Meanwhile, determination processing of selection of insertion, non-insertion, and an insertion distance of a pilot symbol and/or a boundary symbol may be carried out in any one of the transmitting device, the receiving device. In case that this determination is carried out in the transmitting device, it has determination means which carries out determination processing in accordance with information which shows a status of a channel from the receiving device, and controls the switch 13, the pilot data output section 12 and/or the boundary data output section 61. In case that this determination is carried out in the receiving device, determination processing is carried out in the channel frequency characteristic estimation section 24, or determination means is further disposed in the receiving device to carry out determination processing. A result, which was determined in the receiving device, is used for processing in the transmitting device.

Meanwhile, as a parameter which shows a status of the above-described channel, used are CINR (Carrier power-to-Interference and Noise power Ratio) to be obtained from the channel estimator which carries out estimation of a channel on the basis of a received signal in the receiving side device, amplitude information to be obtained from a channel equalizer, a bit error rate in the receiving side device, a data retransmission rate of the transmission signal, and a transmission rate of the transmission signal, a signal power to interference power ratio (SIR), and so on.

This application is based upon and claims the benefit of priority of Japanese Patent Application No. 2004-121373 filed on Apr. 16, 2004, the contents of which are incorporated herein by reference in its entirety.

The invention has such an advantage that it becomes possible to use a pilot symbol which can handle complex information, in data transmission of a multi carrier transmission system which depends on wavelet transform based OFDM for carrying out real coefficient wavelet transform, and is useful for a communication apparatus and a communication method etc. which uses a multi carrier transmission system for carrying out data transmission by use of digital modem processing with the use of a real coefficient wavelet filter bank.

What is claimed is:

1. A communication apparatus of a multi carrier transmission system, which carries out data transmission by digital modem processing, comprising:

a modulator which inserts at least one symbol, to which contiguous identical data is given, into a transmission signal as a pilot symbol, and carries out digital multi carrier modulation processing of transmission signals by use of a filter bank subjecting wavelet transformation; and a transmitter which transmits the transmission signal including said pilot symbol, which is subjected the digital multi carrier modulation processing by said modulator, wherein, in case that N pieces of complex information based on the pilot symbol are obtained and its average is used, said pilot symbol is configured by further adding N−1 symbols to which the contiguous identical data is given.

2. A communication apparatus of a multi carrier transmission system, which carries out data transmission by digital modem processing, comprising:

a modulator which inserts at least one symbol, to which contiguous identical data is given, into a transmission signal as a pilot symbol, and carries out digital multi carrier modulation processing of transmission signals by use of a filter bank subjecting wavelet transformation; and a transmitter which transmits the transmission signal including said pilot symbol, which is subjected the digital multi carrier modulation processing by said modulator, wherein, by use of information which shows a channel status regarding each sub carrier, which is obtained on the basis of a received signal in a communication apparatus of a receiving side, it is determined whether said pilot symbol is inserted into the transmission signal or not.

3. The communication apparatus as set forth in claim 2, wherein, as information which shows the channel information, used is at least one of CINR (Carrier power-to-Interference and Noise power Ratio) to be obtained from a channel estimator which carries out estimation of a channel on the basis of the received signal in the communication apparatus of said receiving side, amplitude information to be obtained from a channel equalizer which carries out equalization of a channel on the basis of the received signal in the communication apparatus of said receiving side, a bit error rate in the communication apparatus of said receiving side, a data retransmission rate of said transmission signal, and a transmission rate of said transmission signal.

4. A communication apparatus of a multi carrier transmission system, which carries out data transmission by digital modem processing, comprising:

a modulator which inserts at least one symbol, to which contiguous identical data is given, into a transmission signal as a pilot symbol, and carries out digital multi carrier modulation processing of transmission signals by use of a filter bank subjecting wavelet transformation; and a transmitter which transmits the transmission signal including said pilot symbol, which is subjected the digital multi carrier modulation processing by said modulator, wherein, by use of information which shows a channel status regarding each sub carrier which is obtained on the basis of a received signal in a communication apparatus of a receiving side, timing of inserting said pilot symbol into the transmission signal is determined.

5. A communication apparatus of a multi carrier transmission system, which carries out data transmission by digital modem processing, comprising:

a modulator which inserts at least one symbol, to which contiguous identical data is given, into a transmission signal as a pilot symbol, and carries out digital multi carrier modulation processing of transmission signals by use of a filter bank subjecting wavelet transformation; and a transmitter which transmits the transmission signal including said pilot symbol, which is subjected the digital multi carrier modulation processing by said modulator, wherein, by use of a boundary symbol having a known signal which is different from the contiguous identical data of said pilot symbol, which is inserted between said pilot symbol and data symbol in the transmission signal, said transmitter transmits the transmission signal.

6. The communication apparatus as set forth in claim 5, further comprising a pilot symbol generator which gives the contiguous identical data, in said at least one symbol, to generate the pilot symbol.

7. The communication apparatus as set forth in claim 5, wherein, by use of information which shows a channel status regarding each sub carrier which is obtained on the basis of a received signal in a communication apparatus of a receiving side, it is determined whether said boundary symbol is inserted into the transmission signal.

8. The communication apparatus as set forth in claim 5, wherein, by use of information which shows a channel status regarding each sub carrier which is obtained on the basis of a communication apparatus of a received signal in a receiving side, timing of inserting said boundary symbol into the transmission signal is determined.

9. The communication apparatus as set forth in claim 5, wherein said transmitter transmits the transmission signal through a power line.

10. The communication apparatus as set forth in claim 5, wherein, in case that N pieces of complex information based on the pilot symbol are obtained and its average is used, said pilot symbol is configured by further adding N−1 symbols to which the contiguous identical data is given.

11. The communication apparatus as set forth in claim 5, wherein, by use of information which shows a channel status regarding each sub carrier, which is obtained on the basis of a received signal in a communication apparatus of a receiving side, it is determined whether said pilot symbol is inserted into the transmission signal or not.

12. The communication apparatus as set forth in claim 11, wherein, as information which shows the channel information, used is at least one of CINR (Carrier power-to-Interference and Noise power Ratio) to be obtained from a channel estimator which carries out estimation of a channel on the basis of the received signal in the communication apparatus of said receiving side, amplitude information to be obtained from a channel equalizer which carries out equalization of a channel on the basis of the received signal in the communication apparatus of said receiving side, a bit error rate in the communication apparatus of said receiving side, a data retransmission rate of said transmission signal, and a transmission rate of said transmission signal.

13. The communication apparatus as set forth in claim 5, wherein, by use of information which shows a channel status regarding each sub carrier which is obtained on the basis of a received signal in a communication apparatus of a receiving side, a timing of inserting said pilot symbol into the transmission signal is determined.

14. A communication method of a multi carrier transmission system, which carries out data transmission by digital modem processing, the communication method comprising the steps of:

inserting at least one symbol, to which contiguous identical data is given, into a transmission signal as a pilot symbol;

carrying out digital multi carrier modulation processing of the transmission signal by use of a filter bank subjecting wavelet transformation; and transmitting the transmission signal including said pilot symbol, to which the digital multi carrier modulation processing is carried out, wherein, by use of a boundary symbol having a known signal which is different from the contiguous identical data of said pilot symbol, which is inserted between said pilot symbol and data symbol in the transmission signal, the transmission signal is transmitted.

* * * * *